US007001891B1

(12) United States Patent
Domb

(10) Patent No.: US 7,001,891 B1
(45) Date of Patent: Feb. 21, 2006

(54) BIODEGRADABLE POLYCATION COMPOSITION FOR DELIVERY OF AN ANIONIC MACROMOLECULE

(75) Inventor: Abraham J. Domb, Efrat (IL)

(73) Assignee: Efrat Biopolymers Limited, Efrat (IL)

( * ) Notice: Subject to any disclaimer, the term of this patent is extended or adjusted under 35 U.S.C. 154(b) by 464 days.

(21) Appl. No.: 10/031,728

(22) PCT Filed: Jul. 18, 2000

(86) PCT No.: PCT/IL00/00420

§ 371 (c)(1),
(2), (4) Date: May 1, 2002

(87) PCT Pub. No.: WO01/07486

PCT Pub. Date: Feb. 1, 2001

(30) Foreign Application Priority Data

Jul. 23, 1999 (IL) ..................................... 131074

(51) Int. Cl.
C12N 15/85 (2006.01)
C07H 21/04 (2006.01)
C08B 37/00 (2006.01)
C07K 14/435 (2006.01)

(52) U.S. Cl. ...................... 514/44; 536/23.1; 536/55.1; 530/395; 435/455

(58) Field of Classification Search .................. 514/44; 536/23.1, 55.1; 530/395; 435/455
See application file for complete search history.

(56) References Cited

U.S. PATENT DOCUMENTS

| 3,225,012 A | 12/1965 | Black et al. |
| 4,146,515 A | 3/1979 | Buikema et al. |
| 5,312,967 A | 5/1994 | Kiely et al. |
| 5,329,044 A | 7/1994 | Kiely et al. |
| 5,434,233 A | 7/1995 | Kiely et al. |
| 5,473,035 A | 12/1995 | Kiely et al. |
| 5,567,685 A | 10/1996 | Linden et al. |
| 5,833,230 A | 11/1998 | Nakagawa et al. |
| 6,011,008 A * | 1/2000 | Domb et al. ................... 514/8 |

FOREIGN PATENT DOCUMENTS

| EP | 0 370 810 | 11/1989 |
| RU | 2027190 | * 1/1995 |
| WO | WO 93/25239 | * 12/1993 |
| WO | WO 95/30020 | 12/1995 |
| WO | WO 98/01162 | 1/1996 |
| WO | WO 97/46223 | 12/1997 |
| WO | WO 98/27209 | 6/1998 |

OTHER PUBLICATIONS

Amselem, et al., "Lipospheres for Vaccine Delivery," In *Microparticulate Systems for Drug Delivery* (Berstein, et al., eds.), pp. 149-168, 1996.
Byk, et al., "Novel cationic lipids for gene delivery and gene therapy," *Exp. Opin. Ther. Patents* 8(9):1125-1141 (1998).
Domb, et al., "Lipospheres for Controlled Delivery of Substances," in *Nanosphere Delivery Systems* (Benita, et al., eds.), pp. 377-410, 1996.
Domb, et al., "Polymers in gene therapy," in *Frontiers in Biological Polymer Applications* (Ottenbrite, ed.) Technomic: Lancaster, vol. 2, pp. 1-16 (1999).
Kiely, et al., "Hydroxylated nylons based on uprotected esterified D-glucaric acid by simple condensation reactions," *J. Am. Chem. Soc.* 116:571-578 (1994).
Ledley, "Nonviral gene therapy: the promise of genes as pharmaceutical products." *Hum. Gene Ther.* 6(9): 1129-1144 (1995).
Liu, et al., "Sugar-containing polyamines prepared using galactose oxidase coupled with chemical reduction," *J. Am. Chem. Soc.* 121:466-467 (1999).
Mao, et al., "DNA-chitosan nanospheres: derivitization and storage stability," *Proc. Intl. Symp. Control Rel. Bioact. Matter* 24: 671-672 (1997).
Pitha, et al., "Detergents linked to polysaccharides:preparation and effects on membranes and cells," *Eur. J. Biochem.* 94(1): 11-18 (1979).
Richardson, et al., "Evaluation of highly purified chitosan as a potential gene delivery vector," *Proceed Intl. Symp. Control Rel. Bioact. Matter* 24: 649-650 (1997).
Takakura, et al., "Control of pharmaceutical properties of soybean tyrosine inhibitor by conjugation with dextran 1: synthesis and characterization," *J. Pharm. Sci.* 78(2): 117-121 (1999).
Treco and Selden, non viral gene therapy, *Molec. Med. Today* 1(7):299-348 (1995).
Walsh, et al., "Combination of drug and gene delivery by gelatin nanospheres for the treatment of cystic fibrosis," *Proc. Intl. Sym. Control. Rel. Bioact. Mater.* 24: 75-76 (1997).
Yamaoka, et al., "Effect of cation content of polycation-type gene carriers on in vitro gene transfer," *Chemistry Letters*, 1171-1172 (1998).

* cited by examiner

*Primary Examiner*—James O. Wilson
*Assistant Examiner*—Ganapathy Krishnan
(74) *Attorney, Agent, or Firm*—Pabst Patent Group LLP

(57) ABSTRACT

The present invention provides a biodegradable polycation composition for delivery of an anionic macromolecule, comprising a polysaccharide chain having an amount of saccharide units ranging from 2 to 2000 and at least one grafted oligoamine per 5 saccharide units, wherein said oligoamine is selected from the group consisting of a linear, branched and cyclic alkyl amine having at least two amino groups.

19 Claims, No Drawings nBIODEGRADABLE POLYCATION COMPOSITION FOR DELIVERY OF AN ANIONIC MACROMOLECULE

CROSS-REFERENCE TO RELATED APPLICATIONS

This application is a 371 of International Application No. PCT/IL00/00420 filed Jul. 18, 2000, which claims priority to Israeli application No. 131074 filed Jul. 23, 1999.

FIELD OF INVENTION

The present invention relates to a biodegradable polycation composition for delivery of an anionic macromolecule.

BACKGROUND

Gene therapy is a process by which genes are introduced into cells which then become mini-factories which manufacture and release essential compounds in cells and tissue which improve the life of the patient. Gene therapy has the potential to revolutionize the treatment of genetic disorders, diseases associated with a genetic component like cancer, AIDS, and many other diseases. Gene therapy may be the only remedy for some individuals who would otherwise die or be severely disabled. Gene transfer may also be employed for systemic protein and peptide-like hormone administration. Nucleic acid sequences coding for a protein (insulin, growth hormone) would be administered to the patient allowing endogenous production of their own medication.

Successful gene therapy requires the identification of an appropriate therapeutic gene for treatment of the disease, in addition to a delivery system by which that gene can be delivered to desired cell type both efficiently and accurately. Early attempts of gene transfer involved the removal of cells from the individual, and the alteration of the cells in the culture by the introduction of a functioning copy of the gene. The next step included grafting the genetically engineered cells back into the patient. This ex vivo approach to gene therapy is obviously limited to those target tissues that are not undergoing frequent multiplication and cell generation that could cause progressing elimination of the grafted cells. The ability of the altered cells to efficiently recombine with the target tissue is another limiting factor of the ex vivo approach since many cells do not exhibit the ability to recombine.

The limitation and the complexity of the ex-vivo approach facilitated the development of direct in vivo gene transfer methods. Direct gene therapy involves the administration of the gene into the body, targeting of the gene to the desired cells and into the nucleus of said genes, and expression of functioning gene products therein. Currently there are two different approaches for direct gene transfer. One is a viral approach and the other is a non-viral approach. Viral and non-viral gene therapies differ in the methods used to deliver genes to the target cells and direct the uptake of gene into the nucleus. Viral gene therapies employ genetically engineered viral particles to deliver the gene to target cell, and non-viral gene therapies employ gene delivery systems comprised of synthetic or semi-synthetic gene formulations. The limitations of viral therapies relate to the residual viral elements within the viral vectors which can be immunogenic, cytopathic, or recombinogenic.

Antisense technology has introduced the possibility of down-regulating or specifically turning off the expression of individual genes. This technology has enormous therapeutic potential. Antisense oligodeoxynucleotides (AON or ODN) constitute sequences of 15 to 21 nucleotides with the order of the nucleotides providing the molecule with the specificity to target genetic material. An oligonucleotide whose bases are tailored to complement part of a particular mRNA, can bind to and complex with that section of the mRNA. This can prevent gene expression which may prevent protein synthesis by passive or reactive inhibition of mRNA translation. Antisense ODN's to DNA seem to inhibit DNA transcription by formation of a triple helix.

Antisense oligonucleotides enter cells by pinocytosis and/or receptor-mediated endocytosis after binding to cell surface antigens. Uncharged oligomers enter cells by passive diffusion and charged oligomers enter by endocytosis. It seems that oligomers are not internalized by cells very efficiently. Methods for improving cellular uptake and biological efficacy of ODN's have been devised, including their conjugation to a synthetic polypeptide poly(L-lysine) tail with or without transferrin, or encapsulation in cationic or antibody targeted liposomes.

As with other modes of contemporary gene therapy, delivery remains a central and crucial issue. For example, Antisense oligonucleotides per se are thought not to cross the intact Blood Brain Barrier (BBB). There are no studies analyzing the passage of antisense oligomers across the Blood Brain Barrier. Attempts to deliver them across the BBB by hyperosmotic BBB disruption after conjugation or by incorporation into liposomes have, as a whole, been unsuccessful. Direct injection of free antisense results in their rapid breakdown.

Although, most research in vivo gene therapy has focused on the use of recombinant virus vectors, progress has been made toward developing non-viral formulations of gene for in vivo human gene therapy. The advantages of non-viral vectors are that they can introduce DNA into non-dividing cells, do not integrate into the chromosome, do not posses infective risk, and are potentially less expansive than viral vectors. The principle underlying non-viral gene delivery is that the problem of delivering DNA in vivo is not significantly different from the problem of delivering conventional drugs or biological products to intracellular compartment in the body. Non-viral gene therapies involve known drug delivery methods for the administration and targeting of genes to selected cells in vivo, where they express therapeutic products.

Various methods have been described for non-viral gene therapy, ranging from the direct administration of "naked" plasmid DNA to the systemic administration of complex synthetic formulations. Some approaches are aimed at developing "artificial viruses" that attempt to mimic the process of viral infection using synthetic or semi-synthetic components. Others apply the theory and method of advanced, particulate drug delivery to administer DNA to selected somatic targets. These approaches employ plasmid DNA complexes containing lipids, proteins, peptides, or polymeric carriers. The principle disadvantage associated with non-viral systems has been insufficient levels of gene expression, irreproducibility and significant variations in gene expression on various cell types.

The two classes of synthetic gene delivery systems that have been investigated most actively involve the use of either cationic liposomes or polycationic polymers. The assembly of these systems is achieved by an electrostatic condensation of the "anionic" DNA with the "cationic" moiety of either a lipid or a synthetic polymer. The cationic polymer-based systems have been most widely associated with the formulation of receptor-mediated gene delivery systems. This technique employs the ability of receptors on the surface of a variety of different cells to efficiently bind and internalize a ligand. Several ligands have been exploited for the efficient internalization of DNA-ligands complexes. These include: asialoorosmucoid and other galactosylated proteins which target the hepatic asialoglycoprotein receptor; transferrin which binds to the transferrin receptor and mannosyl which is recognized by the mannose receptor of macrophages. Targeting ligands are covalently linked to a polycation polymer, typically to poly(lysine) derivatives, and then form a ligand-poly(lysine)-DNA complex by the ionic interaction between the positively charged poly(lysine) and the negatively charged DNA. Often, an endosomolytic agent is added to the transfection mixture to induce endosomal lysis and enhance DNA release from the endosome in order to achieve high transfection efficiency. The efficiency of poly(lysine)-DNA conjugates in transfecting numerous cell types in vitro has been demonstrated, but their potential usefulness for in vivo human gene therapy is limited due to their cytotoxicity.

More advanced polymeric gene delivery systems employ macromolecules with a very high cationic charge density that act as an endosomal buffering system, thus suppressing the endosomal enzymes activity and protecting the DNA from degradation. The high cationic charge density mediates both DNA condensing and buffering capacity, that diminish the requirement for an endosomolytic agent addition.

Polymers Used in Gene Transfer

The polycations used for gene complexation are polyamines that become cationic at physiologic conditions. All polymers contain either primary, secondary, tertiary or quaternary amino groups capable of forming electrostatic complexes with DNA under physiologic conditions. The highest transfection activity is obtained at a 1.1–1.5 ratio of polycation to DNA. The most studied polyamines for gene transfer includes, poly(lysine) and its derivatives, polyamidoamine starburst dendrimers, polyethyleneimine, natural and modified polysaccharides, and acrylic cationic polymers. The details for each polymer class are described in Domb et al. (A. Domb, M. Levy, Polymers in gene therapy, Frontiers in Biological Polymer Applications, R. M. Ottenbrite (ed), Technomic, Vol. 2, 1999,1–16.).

Polycations may be more versatile for use than the liposomes and other conventionally used spherical gene carriers. Several polycations have been reported to induce gene expression for example diethylaminoethyl dextran and other cationized polysaccharides [F. D. Ledley, Huiman Gene Therapy, 6, 1129, 1995; Yamaoka et al. Chemistry Letters, 1171–72, 1998]. These polymers have little structural similarity with each other except possessing cationic groups.

Cationic polysaccharides have been used for gene delivery. Chitosan, a linear cationic polysaccharide was suggested by several authors for gene delivery [K. W. Leong et al, DNA-Chitosan nanospheres: Transfection efficiency and cellular uptake, Proceed. Intl. Symp. Control. Rel. Bioact. Mater. 24:75–76, 651–652, 671–674, 1997; R. Richardson, H. V. J. Kolbe, R. Buncan, Evaluation of highly purified chitosan as a potential gene delivery vector, Proceed. Intl. Symp. Control. Rel. Bioact. Mater. 24:649–650, 1997] DNA-chitosan nanospheres were found to be significantly less toxic than poly(L-lysine) or Lipofectin using the MTT test. Compared to standard Lipofectamine mediated gene transfer, these nanospheres yield lower levels of gene expression in HEK 293 (human embryonic kidney cells), IB3 (bronchial epithelial cells) and HTE (human tracheal epithelial cells). Surface modification of DNA/chitosan complex nanoparticles by covalently binding poly(ethylene glycol), transferrin and mannose-6-phosphate receptor to facilitate entry into cells and improve storage stability was also studied. The Purified and hydrophobized chitosan has also been suggested as carrier for genes [K. Y. Lee, I. C. Kwon, Y. H. Kim, W. H. Jo, S. Y. Jeong, Selfaggregates of hydrophobically modified chitosan for DNA delivery, Proceed. Intl. Symp. Control. Rel. Bioact. Mater. 24:651–652, 1997].

Midox (WO 95/30020) describes a polypeptide such as polylysine modified at the g-amino group with a molecule bearing hydroxyl groups. Genzyme describes in WO 97/46223 lipid derivatives of short chain alkylamines such as spermine and spermidine for use in gene transfection. For example, one or two spermine or spermidine groups attached to cholesterol via an amide or carbamate bonds. WO 98/27209 to Emory Univ. describes a range of modified cationic polypeptides based on lysine for use in gene transfection.

The polymers described in the prior art can be grouped into two catagories: One including linear or dendrimeric polymers with random distribution of amino groups which are part of the polymer backbone such as poly(ethylene imines), poly(amido-amine) dendrimers, and poly(alkylamino-glucaramide). The second including linear polymers with a single primary secondary or tertiary amino group attached to the polymer units. Examples of such polymers are: poly(dimethylaminoethyl methacrylates), dimethylamino dextran, and polylysines.

All of the above polymers are polycations with a random distribution of the cationic sites. This randomness is probably the reason for the fact that these polymers may work for some nucleotides and cell types and not for others. Most of these polymers are toxic to cells and non-biodegradable, while the polymers based on amino acids such as polylysines are immunogenic.

It can be said that in the prior art, little attention was given to:
1. the structure of the polycation, the charge density and space distribution of cationic groups in the polymer to optimize complexation with anionic nucleotides;
2. the type of cationic groups, primary, secondary or tertiary groups were considered as cationic sites.
3. the toxicity and immunogenicity of the polymer;
4. the biodegradability and elimination properties of the polymer carrier;

In general, it has been believed that the cationic charge of the polymers is the main factor important for complexation and transfection. Also, these cationic polymers did not result in high enough transfection yield for commercial interest in ex-vivo experiments, in addition to animal experimentation. The degradation and elimination of the polymer carrier was not carefully treated and most polycations described for use in gene therapy are not biodegradable and/or toxic.

In designing a universal polycation system for gene delivery one should consider the way in which a plasmid becomes active in the cell and tissue. The plasmid has first to be protected from DNA degrading enzymes in the extracellular medium, then penetrate the cell wall, protected from degrading systems, i.e. the lisosome and enzymes, in the intracellular medium until it is internalized in the nucleus, penetrate into the nucleus and being released in its active form from the polymer carrier.

This invention describes a versatile and universal polycation system based on oligoamine grafted on natural or synthetic polysaccharides that is capable of complexing various plasmids and antisense, administering them into various cells in high yields and into the nucleus in active form to produce the desired protein.

It is the objective of the present invention to provide polycations that:
1. better fit the complexation requirements for effective delivery of a plasmid or an antisense;
2. biodegrade into non-toxic fragments at a controlled rate;
3. non-toxic and no-immunogenic in vivo;
4. form a stable enough complex with low and high molecular weight polynucleotides including therapeutic plasmids and antisense.
5. provide effective polymeric delivery system that result in a high transfection yield in a range of cells and in tissues.
6. can be reproducibly prepared at an affordable cost.

Another objective of this invention is to provide a controlled release of DNA in tissue or cell by complexing DNA with designed polymers that gradually de-complex and release the DNA or by incorporation of the complexed polynucleotides in a biodegradable matrix which will release the DNA in the site of insertion for periods of weeks and months.

Thus, according to the present invention there is provided a biodegradable polycation composition associated with an anionic macromolecule, said macromolecule being selected from the group consisting of a plasmid, an oligonucleotide, an antisense, a peptide, a protein, an anionic polysacharide and combinations thereof, comprising:
a) a polysaccharide chain having an amount of saccharide units ranging from 2 to 2000; and
b) at least one grafted oligoamine per 5 saccharide units, wherein said oligoamine is selected from the group consisting of a linear, branched and cyclic alkyl amine having at least two amino groups and said oligoamine has a molecular weight of up to 2000 daltons.

In another preferred embodiment of the present invention said polysaccharide chain is selected from the group consisting of dextrans, arabinogalactan, pullulan, cellulose, cellobios, inulin, chitosan, alginates and hyaluronic acid.

In a further preferred embodiment of the present invention said saccharide units are connected by a bond selected from the group consisting of acetal, hemiacetal, ketal, orthoester, amide, ester, carbonate and carbamate In an even further preferred embodiment of the present invention said polysaccharide is a synthetic polysaccharide formed from the condensation of an aldaric acid and a diaminoalkane.

In a preferred embodiment of the present invention said grafted oligoamine is grafted to said polysaccharide chain by a bond selected from the group consisting of amine, amide and carbamate. In another preferred embodiment the oligoamine has the formula:

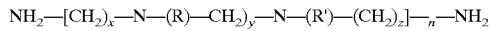

NH$_2$—[CH$_2$)$_x$—N—(R)—CH$_2$)$_y$—N—(R')—(CH$_2$)$_z$]—$_n$—NH$_2$ wherein x, y, z are an integer between 0 and 4 and x+y+z is between 1 and 4 and n is at least 1 when x+y+z=2 or more, or at least 2 when x+y+z=1 and wherein R and R' groups are H or an aliphatic side group of 1 to 6 carbons.

In a further preferred embodiment of the present invention said oligoamine is selected from the group consisting of spermine and derivatives thereof.

In an even further preferred embodiment of the present invention said oligoamine is selected from the group consisting of a linear and branched ethyleneimine oligomer having up to 10 ethylene imine units.

In an even further preferred embodiment of the present invention said oligoamine is selected from the group consisting of a a peptide consisting of up to 20 amino acids with at least 50% contain a cationic side group including, lysine, ornithine, and diphthamic acid.

In a preferred embodiment of the present invention said amphiphilic residue is selected from the group consisting of fatty chains, phospholipids, cholesterol derivatives, ethylene glycol oligomers and propylene glycol oligomers, wherein said ethylene and propylene glycol oligomers have a fatty chain block on one side.

In a further preferred embodiment of the present invention said amphiphilic residue is connected to said polysaccharide chain by a bond selected from the group consisting of an amine, amide, imine, ester, ether, urea, carbamate and carbonate.

In an even further preferred embodiment of the present invention said amphiphilic residue facilitates the crossing of the polycation through biological membranes.

In a preferred embodiment of the present invention said polycation composition is not toxic or immunogenic.

In an even further preferred embodiment, the composition of the invention further comprises a ligand for facilitating the binding of said composition to a predetermined type of cell or tissue.

It is a further an objective of the invention to provide a pharmaceutical composition comprising the composition described above, in combination with a pharmaceutically acceptable carrier.

It is a further an objective of the invention to provide a pharmaceutical composition comprising the composition described above, in combination with amphiphilic cationic and/or nonionic lipids and cationic and nonionic polymers generally used for nucleotide delivery transfection. Examples of lipids include DOTMA, DOTAP, DMRIE, GAP-DLRIE, DODHF, aklylated spermine, and other derivatives described in: G. Byk and D. Scherman, Exp. Opin. Ther. (1998) 8(9): 1125–1141; D. A. Treco and R. F. Selden, non viral gene therapy, Molec. Med. Today, 1995, 1(7): 299–348).

The present invention describes a range of biodegradable polycations based on grafted oligoamine residues on synthetic or a natural polysaccharides which are effective in delivering plasmids and antisense for a high biological effect. The grafting concept where side chain oligomers are attached to either a linear or branched hydrophilic polysaccharide backbone, allows two/three dimensional interaction with an anionic surface area typical to the double or single strand DNA chain. This type of flexible cationic area coverage is not available with non-grafted polycations or low molecular weight cations. Low molecular weight amines and their lipid derivatives such as the lipofectin and lipofectamine have a localized effect on the DNA which the degree of complexation is dependent on how these small molecules organized around the anionic DNA. Each molecule has to be synchronized with the other molecules at all times of the transferction process whereas when the oligoamines are grafted on a polymer they are already synchronized and each side chain helps the other side chains to be arranged to fit the anionic surface of the given DNA. By grafting the functional groups is an average distribution along a polymer chain at a certain distance between each other (for example, grafting an oligoamine chain every one, two, three or four polymer unit may provide optimal complexation with various DNAs).

U.S. Pat. No. 4,146,515 (D4) describes oxidation of starch and reacting it in bulk with epichlorhydrin-dimethylamine or ammonia to improve the industrial properties of starch. The product is cationic but is not a grafted oligoamine conjugated to a polysaccharide.

WO93/25239 (D3) to Advanced Magnetics describes a range of derivatives of arabinogalactran. In Example 10 page 19, there is described the treatment of AG with galactose oxiddase (GO). The reaction details are given including the purification process and determination of the number of aldehyde groups formed. The oxidation with the enzyme takes place at room temperature which yields 0.34 milliequivalents of aldehydes. This is an alternative method of oxidation of AG and is not related to an oligoamine conjugated to polysaccharides.

In example 6, page 17 of said publication, there is described the reaction between polylysine and arabinogalactan (AG) at a ratio of 500 mg polylysine and 100 mg of AG in the present of cyanoborohydride as reducing agent. The resulting product yield was 30 mg which represents a 5% yield. No date is given on the analysis of this product besides a comment that the product contains an amine and saccharide and has a molecular weight of 25,000. Under these reaction conditions in which AG was not oxidized and native AG was used, the chance for a chemical conjugation between polylysine and AG is very low as there are no or only a few aldehyde groups on AG that are available for a reductive amination reaction. Indeed, the negligible yield of 5% with no characterized product indicates that probably nothing was obtained in this reaction and the 5% material isolated was either polylysine contaminated with AG or AG contaminated with polylysine, the latter seeming more probable as native AG has a molecular weight of 25,000. Thus this example does not teach or suggest to a person skilled in the art the formation of an oligoamine conjugated with polysaccharides.

WO 98 01162 (D1) describes the formation of Chitosan nanoospheres containing DNA complexed with the cationic groups of the native Chitosan. Page 17 and FIGS. 7 and 8 describe in detail the formation of the Chitosan nanospheres loaded with the DNA. Chitosan contains one amino group per saccharide unit as it is a polymer of glucose amine. This polymer is a polysaccharide with one amino side group which is not an oligoamine conjugated to a polysaccharide.

RU 2,027,190 (D2) describes a conjugate of polysaccaharide antigen and polyethylene imine as an immunosorbent for detecting streptococcal and pneumococcal infections. Said reference thus teaches an antigen which is chemically bound to a polysaccharide via a spacer which is a polyethylene imine and does not teach or suggest an oligoamine conjugated to a polysaccharide.

U.S. Pat. No. 5,567,685 describes the conjugation of various oxidizable drugs to a polysaccharide, however, does not teach or suggest an oligoamine conjugated to polysaccharide.

The use of biodegradable cationic polyol carriers is especially suitable for transfection and biological applications because they are water soluble and miscible in aqueous vehicles. The resultant grafted polymers are water soluble or dispersible in water, it can be readily transported to cells in vivo by known biological processes, and acts as an effective vehicle for transporting agents complexed with it.

The compositions of the present invention are composed of a natural or synthetic polysaccharide backbone with a grafted complexation functionality, i.e. aliphatic organic cationic residues containing at least two amino groups. The alkyl amino cationic residues are distributed in an optimal charge distribution tailored for as many plasmid or oligonucleotide for optimal transfection results. The polymer has hydrophobic/hydrophilic side groups that allow penetration of the polymer-plasmid complex into cells for transfection.

DETAILED DESCRIPTION OF THE INVENTION

The present invention provides a new class of non-viral polymeric vectors that can be used for both in vitro and in vivo transfer of biologically active molecules. In particular, these vectors can be used for gene transfer applications. The polycationic compositions of the present invention can achieve gene transfer efficiencies in vitro that are superior to commercially available cationic liposome preparations. Further, the low toxicity and lack of serum inhibition of the compositions is suitable for in vivo use. The present invention provides a vector that can achieve in vivo gene transfer efficiencies that compare favorably to viral vector systems. The present invention further provides a method to increase the capacity of solutions to carry complexes of nucleic acids and the polymeric vector without precipitation or toxic ionic effects on cells.

Furthermore, the unique polycationic structure of this class of polymers associates with many suitable bioactive molecules, including proteins and other compounds that possess multiple anionic sites. The polymer can act as a carrier to deliver the associated bioactive molecule, in vivo or in vitro, to the cells of interest for the bioactive molecule.

In addition, the unique polycationic structure of this class of polymers are biodegradable and readily eliminated from the body after administration.

In one aspect the invention provides a complex comprising a nucleic acid and a transfection agent, wherein:
a) the transfection agent is obtained by the conjugation of short aliphatic oligoamine to a polysaccharide containing hydrophobic and/or amphiphilic side groups to allow penetration into cells.
b) the short aliphatic oligoamine conjugated to the polymer contains at least two amino groups.
c) The hydrophobic and/or amphiphilic sites attached to the polymer are for example fatty chains, phospholipids or cholesterol derivatives or ethylene or propylene glycol oligomers with or without a fatty residue block, which have the capacity to allow penetration into cells. The density and quality of the hydrophobic side groups are selected to allow optimal transfection both in vitro (cells) and in vivo (humans).
d) The transfection agent is able to deliver a gene, antisense or nucleic acids into cells and/or nucleus, release them in active from to allow substantial biological effect by the gene or antisense and, biodegrade into non-toxic fragments that are eliminated from the cell or the body.

As used herein the term "transfection agent" means any chemical agent capable of facilitating the entry of a nucleic acid into a eukaryotic cell.

As used herein the term "nucleic acid" means a polymer of nucleotides, and specifically includes plasmids, coding DNA sequences, mRNAs, and antisense RNA molecules. A nucleic acid can be single- or double-stranded. The nucleic acids can also contain one or more substitute linkages. These substitute linkages include conventional alternative linkages such as phosphorothioate and phosphoramidate, and are synthesized as described in generally available literature. Nucleic acids also include those nucleotides in which the sugar moiety has been modified by, for example, substitution of one or more hydroxyl groups with halogen, aliphatic groups, or functionalized as ethers, amines, or wherein the ribose or deoxyribose is replaced with other functionally equivalent structures. In particular, the sugar-phosphate backbone may be replaced with a non-carbohydrate backbone such as a peptide or other type of polymer.

As used herein the term "primary amine" means any amine that possesses one or more primary amine functionality.

As used herein the term "secondary amine" includes amine moieties having at least two pendent hydrocarbon groupings, and also includes, in the appropriate context, tertiary and quaternary amines.

As used herein "a" can mean one or more, depending upon the context in which it is used.

As used herein "aliphatic" and "aromatic hydrocarbons" include both substituted and unsubstituted compounds, wherein the substitution can occur in the backbone or pendent groupings of the hydrocarbon. Aliphatic compounds may be branched or straight chained.

As used herein "polysaccharide" means, linear, branched or crosslinked natural or chemically modified polysaccharides. It also includes synthetic copolymers having at least 40% saccharide units in the polymer backbone. A particular example is polyamides of glucaric acid with alkanediamines.

As used here "oligoamine" means a linear, cyclic and branched alkaneamine that contain at least two amino groups. The molecular weight of the oligoamine is limited to about 2,000 Daltons.

The present invention relates to a novel class of polycationic polysaccharides having effective nucleic acid transfection properties and bioactive agent delivery attributes. The polymers are obtained from the conjugation of an oligoamine to a polysaccharide chain. The polysaccharide carrier, the oligoamine and the grafting ratio bond type are selected to enhance the degree and efficiency of transfection. For example, polymers can be selected based upon the density and distribution of the cationic sites on the polymer to obtain transfection agents that are tailored to the anionic charge distribution of the nucleic acid being transfected, and the anionic charge distribution of the type cell being targeted. Various substituents can also be incorporated into the polymer to affect the properties of the polymer by improving the transfection efficiency thereof.

The present invention provides (1) a class of polycationic polymers, (2) a class of complexes comprising these polymers with nucleic acids, and (3) a class of complexes comprising these polymers with suitable anionically charged bioactive agents. The class of polycationic polymers comprises products obtained by the grafting of an oligoalkaneamine onto a suitable polysaccharide, wherein the grafted oligoamine contains at least two amines. In a particularly preferred embodiment, the grafted primary amine has one primary amine and three secondary amines.

Examples of suitable polysaccharides include, for example, dextrans, arabinogalactan, pullulan, cellulose, chitosan, inuline, hyaluronic acid, and alginates having from 2 to 2,000 saccharide units. Other classes of polysaccharides are polyureas or polyamides of aldaric acids such as mucic acid, glucaric acid, galactaric acid, xylaric acid, and their various isomers polycondenced with aliphatic diamines. The copolymerization of the comonomers may be performed generally by methods known in the art, including by condensation reactions. Examples of suitable polycondensation techniques are described in detail in Kieley et al., *J. American Chemical Society*, 116, 571–578 (1994), Kieley et al., U.S. Pat. Nos. 3,225,012; 5,434,233; 5,312,967; 5,473,035; 5,833,230; and 5,329,044; and Dewar et al.

The ionic association of the polymer/nucleic acid charges neutralizes the anionic charges on the nucleic acid and allows the complex to interact and bind more favorably with the negatively charged cell surface. If an excess of cationic sites are present on the polymer, i.e. more than are necessary to neutralize the anionic charges on the nucleic acids, these excess cationic charges may facilitate the attraction of the complex to the ionically charged surface of the cell, thereby facilitating entry of the complex into the cell. The polymers may also compact the nucleic acids upon complexation, which further enhances the likelihood of entry.

Although the present invention is limited to grafted oligoalkylamines, various substitutents can be incorporated into the polymer carrier. For example, the hydroxyl groups on the aliphatic chain of the monosaccharides can be substituted with aliphatic hydrocarbons, amides, azo, carbamate, carboxylic esters, ethers, thioethers, thiols, fluorescent derivatives, and sulfonic acids. One is often able to increase the hydrophobicity of the polymer (where hydrophobicity is desired) by alkylating the secondary amines with long chain hydrocarbons. Alternatively, one may increase the amphiphilicity by attaching a polyethylene glycol (PEG) chain.

The structure of the polymer can also be altered, by known techniques, to optimize the transfection and delivery efficiency of the polymer for each cellular target on the basis of the physiological and biological characteristics of that target. For example, the efficiency of gene delivery to cells can be enhanced by the addition of peptides with the nuclear targeting signal of simian virus 40 to the polymer. Several protein ligands are also known that can be covalently coupled to the polymer and then incorporated into a ligand-nucleic acid complex. The resulting complexes retain their ability to interact specifically with cognate receptors on the target cell.

Another method for improving the efficiency of gene delivery is to enhance the release of DNA from the endosome after it has entered the cell. Adenoviral particles can be coupled to the polymer to increase this efficiency. Synthetic peptides can also be designed and incorporated into the polymer in order to enhance endosomal release.

The biodegradable polycation compositions of the present invention are of general use for gene transfer and bioactive agent delivery with respect both to cell type and size of nucleic acid or bioactive agent because the transfection is driven by ionic interactions. Any selected cell into which transfection of a nucleic acid or delivery of a bioactive agent (via transfection or other means) would be useful can be targeted by this method, by administering the composition in a suitable manner to bring the complosition into contact with the selected cell, as is known in the art. Cells can be within a tissue or organ, for example, supplied by a blood vessel into which the composition is administered. The composition of the present invention can be formulated into a slab, pellet, microsphere and nanosphere made of a biodegradable component such as a biodegradable polymer or fat to allow targeting and/or controlling long term release of the gene complex to the blood system or to a specific site as known in the literature for common bioactive molecules. Alternatively, for example, the composition can be directly injected into the target tissue or organ. As a further example, the lungs can be targeted by inhalation or intratracheal injection of the complex or particles containing the complex. The invention has application to all eukaryotic cells; it can be used particularly for mammalian cells and subjects, such as humans, cows, horses, sheep, pigs, rats and mice. Some examples of cells that can be targeted by the composition of the present invention include fibroblasts, epithelial cells, endothelial cells, blood cells and tumor cells.

Due to the fact that the polyol backbone according to one of the embodiments of the invention is both biodegradable and regularly imported into living cells as part of normal biosynthetic processes, it is nontoxic and nonimmunogenic, which offers a distinct advantage over viral vectors when used as transfection agents. Similarly because polyols do not generally contain natural binding sites for serum, the polyol backbone is not negatively impacted by circulating serum proteins such as herparin and albumin. Complexes formed with the polymers thus reach targeted cells intact without significant serum inhibition, in contrast to polycationic lipids which are substantially impacted by natural systemic serums.

The amount of DNA that is carried in solution can also influence the degree of transfection of the composition. The concentration of DNA in solution is often limited by its tendency to precipitate at higher concentrations. In some applications, the DNA concentration in solution is limited to about 1.0 g/l. Increased amounts of DNA-polymer in solution which does not precipitate, may be achieved if proper methods of preparation and optimal polymer to DNA ratio and polymer structure are used. In such preparations it may be possible to obtain solutions carrying 20 grams of DNA per litter of solution.

Suitable delivery and transfection conditions are when the cell and composition temperature is between about 18° C. and about 42° C., with a preferred temperature being between about 22° C. and about 37° C. For administration to a cell in a subject, the complex, once in the subject, will of course adjust to the subject's body temperature. For ex vivo administration, the complex can be administered by any standard method that would maintain viability of the cells, such as by adding the complex to a culture medium (appropriate for the target cells) and adding this medium directly to the cells. The medium used in this method should be aqueous and non-toxic so as not to render the cells non-viable. In addition, the medium can contain nutrients for maintaining viability of cells, if desired.

The composition can be administered in vivo by parenteral administration, e.g., by intravenous injection including regional perfusion through a blood vessel supplying the tissue(s) or organ(s) having the target cell(s). Injectables can be prepared in conventional forms, such as liquid solutions, suspensions, or emulsions. A slow release or sustained release system can also be used, allowing the maintenance of a constant dosage level.

Other means of administration can include inhalation of an aerosol, subcutaneous, intraperitoneal or intramuscular injection, topical administration such as to skin wounds and lesions, direct transfection into, e.g., bone marrow cells prepared for transplantation and subsequent transplantation into the subject, and direct transfection into an organ that is subsequently transplanted into the subject. Further administration methods can include oral administration, particularly when the complex is encapsulated, or rectal administration, particularly when the complex is in suppository form.

A pharmaceutical composition according to the present invention can include the composition and a pharmaceutically acceptable carrier suitable for the selected mode of administration. A pharmaceutically acceptable carrier includes any material that will not cause any undesirable biological effects or interact in a deleterious manner with the biological host or with the components within the pharmaceutical composition. A pharmaceutical composition can further include other medicinal agents, pharmaceutical agents, adjuvant, diluents, stabilizers, etc., as long as they do not interfere with the action of the composition. Actual methods of preparing such dosage forms are known or will be apparent to those skilled in the art, (for example—Martin, E. W. *Remington's Pharmaceutical Sciences*, latest edition, Mack Publishing Co., Easton, Pa.)

Transfections using combinations of a plasmid:polycation complex of this invention and various cationic, anionic and amphiphilic polymers and molecules. The plasmid dna complex consisted of plasmid dna, oligoamine polysaccharide condensing agent and a peptide (a peptide described in U.S. patent application Ser. No. 07/913,669, filed Jul. 14, 1992). Addition of amphipathic polymers: polyethylene glycol (PEG); polypropylene glycol (PPG) and PEG-PPG copolymers, phosphatidyl choline, cholesterol derivatives, and non-ionic surfactants, the transfection efficiency of the plasmid dna complex was significantly enhanced over the plasmid dna complex alone or the polymers alone. The addition of an anionic polymer or lipid may result in destabilization of the net positively charged plasmid dna complex by its negative charge and thus may better release the plasmid in the nucleus or in the other hand may de-complex the plasmid and the activity may be reduced. Several mechanisms of action of amphipathic polymers may account including: stabilization of plasmid dna complexes due to coating; increased cell membrane permeability, thereby allowing easier passage of the plasmid dna complex through the cell, membrane and/or volume exclusion, increasing the concentration of plasmid dna complexes at the cell surface.

Another objective of this invention is to provide a controlled release of biologically active dna in tissue or cell by complexing them with the polycations of this invention that gradually de-complex and release the biomacromolecule, DNA, antisence, and a protein or a polysaccharide (heparin) or by incorporation of the complex in a biodegradable matrix, which will release the DNA or DNA complex in the site of insertion for periods of weeks and months.

The following polymers, oils and surfactants may be suitable for use as compounds which enhance gene transfection and/or prolong the localized bioavailability of a nucleic acid: salts of hyaluronates; salts of alginates; heteropolysaccharides (pectins); poloxamers (pluronics); poloxamines (tetronics); polyethylene glycols; dextrans; polyvinylpyrrolidones; chitosans; polyvinylalcohols; propylene glycols; phosphatidylcholines (lecithins); xanthan gum, polyethylene glycol-polylactic-glycolic acid (PEG-PLA), polyethylene glycol-polyhydroxybutyric acid (PEG-PHB), fatty acid and alcohols and their esters, glycofurol, cremophors, and oil mixtures. These substances may be prepared as solutions, suspensions, gels, emulsions or microemulsions of a water/oil (w/o), water/oil/water (w/o/w), oil/water (o/w) or oil/water/oil (o/w/o) type. Oil suspensions of lyophilized nucleic acid, such as plasmid DNA may be utilized. Carriers for these oil suspensions include, but are not limited to, sesame oil, cottonseed oil, soybean oil, lecithins, tweens, spans and miglyols. By "solutions" is meant water soluble polymers and/or surfactants in solution with nucleic acids. By "suspensions" is meant water insoluble oils containing suspended nucleic acids. By "gels" is meant high viscosity polymers containing nucleic acids. By "emulsion" is meant a dispersed system containing at least two immiscible liquid phases. Emulsions usually have dispersed particles in the 0.02 to 100 micron range. Nucleic acids in the water phase can be dispersed in oil to make a w/o emulsion. This w/o emulsion can be dispersed in a separate aqueous phase to yield a w/o/w emulsion. Alternatively, a suitable oil could be dispersed in an aqueous phase to form an o/w emulsion. A "microemulsion" has properties intermediate to micelles and emulsions and is characterized in that they are homogenous, transparent and thermodynamically stable. They form spontaneously when oil, water, surfactant and cosurfactant are mixed together. Typically, the diameter of the dispersed phase is 0.01 to 0.1 microns, usually of the w/o and o/w type.

The compounds which prolong the bioavailability of a nucleic acid may also interact or associate with the nucleic acid by intermolecular forces and/or valence bonds such as: van der waals forces, ion-dipole interactions, ion-induced dipole interactions, hydrogen bonds, or ionic bonds. These interactions may serve the following functions: (1) stereoselectively protect nucleic acids from nucleases by shielding; (2) facilitate the cellular uptake of nucleic acid by endocytosis. To achieve the desired effects set forth it is desirable, but not necessary, that the compounds which prolong the bioavailability of a nucleic acid have amphipathic properties; that is, have both hydrophilic and hydrophobic regions. The hydrophilic region of the compounds may associate with the largely ionic and hydrophilic regions of the nucleic acid, while the hydrophobic region of the compounds may act to retard diffusion of nucleic acid and to protect nucleic acid from nucleases. Additionally, the hydrophobic region may specifically interact with cell membranes, possibly facilitating endocytosis of the compound and thereby nucleic acid associated with the compound. This process may increase the pericellular concentration of nucleic acid. Agents which may have amphipathic properties and are generally regarded as being pharmaceutically acceptable are the following: methylcelluloses, hydroxypropylcelluloses, hydroxypropylmethylcelluloses; heteropolysaccharides (pectins); poloxamers (pluronics); poloxamines (tetronics); ethylene vinyl acetates; polyethylene glycols; polyvinylpyrrolidones; chitosans; polyvinylalcohols; polyvinylacetates; phosphatidylcholines (lecithins); propylene glycol; miglyols; polylactic acid; polyhydroxybutyric acid; xanthan gum. Also, copolymer systems such as polyethylene glycol-polylactic acid (PEG-PLA), polyethylene glycol-polyhydroxybutyric acid (PEG-PHB), polyvinylpyrrolidone-polyvinylalcohol (PVP-PVA), and derivatized copolymers such as copolymers of n-vinyl purine (or pyrimidine) derivatives and n-vinylpyrrolidone.

Nucleic acids may be loaded into biodegradable hydrogels such as crosslinked polysaccharides, and PEG based gels by placing swellable hydrogel systems in nucleic acid or complex solutions. Swellable hydrogels include but are not limited to crosslinked oxidized arabinogalactan and dextran with a polyamine; calcium-crosslinked alginate, poloxamines (tetronics) and poloxamers (pluronics).

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

EXAMPLE 1

Grafting of Oligoamine on Polysaccharides and the Biological Testing Thereof

A range of polyethyleneimine (PEI, MW=600), spermine (4 amines) and spermidine (3 amines) conjugated to arabinogalactan (AG, a branched polysaccharide, MW=25,000) dextran (Dex, a linear 1,6-polyglucose, MW=30,000) or pullulan (Pol, a linear 1,4 polyglucose, MW=50,000) were prepared. The oligoamines were grafted by an amine or imine bond after oxidation of the polysaccharide into a polyaldehyde. The difference between the polymers tested for biological activity were:
1. the oligoamine used, either PEI, spermine or spermidine;
2. the type of polysaccharide, AG, pullulan or Dex;
3. the type of bond, amine or imine;
4. the content of oligoamine per saccharide unit;

All polymers contained a Triton 100 residue grafted on about 4% of the saccharide units in the polymer carrier. This grafting was applied to the polysaccharides by reacting an epoxide or carboxylic acid derivative of Triton with the polysaccharide in a mixture of DMF:water as described below and in J. Pitha et al. (Detergents linked to polysaccharides: preparation and effect on membranes and cells, Eur. J. Biochem. 94, 11–18, 1979).

The following materials were prepared and used in the synthesis of the various grafts:

AG (1:1): oxidized Arabinogalactan produced by reacting 1 mole of saccharides units and 1 mole of periodate (35% of saccharides units were converted to di-aldehydes).

AG (1:5): oxidized Arabinogalactan produced by reacting 1 mole of saccharides units and 0.2 mole of periodate (8% of saccharides were converted to di-aldehydes).

Dex (1:1): oxidized Dextran produced by reacting 1 mole of saccharides and 1 mole of periodate (50% of saccharide units were converted to di-aldehydes).

Pol (1:1): oxidized pullulan produced by reacting 1 mole of saccharides units and 1 mole of periodate (degree of oxidation was not determined).

PEI: Polyethylene imine (Mw=600).

Red: Reduced conjugates (amine bonds).

Unred: Unreduced conjugates (imine bonds).

Triton-X100 is an amphiphilic molecule of the structure:

Structures of amino-compounds used for Conjugations

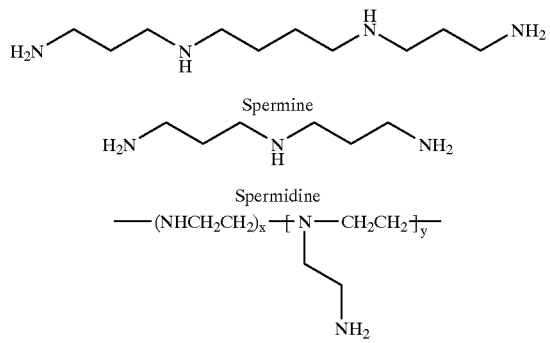

Oxidation of Polysaccharides (I) and Typical Reactions Between Oxidized Polysaccharides and Polyamines (II) are Presented by the Following Formulas:
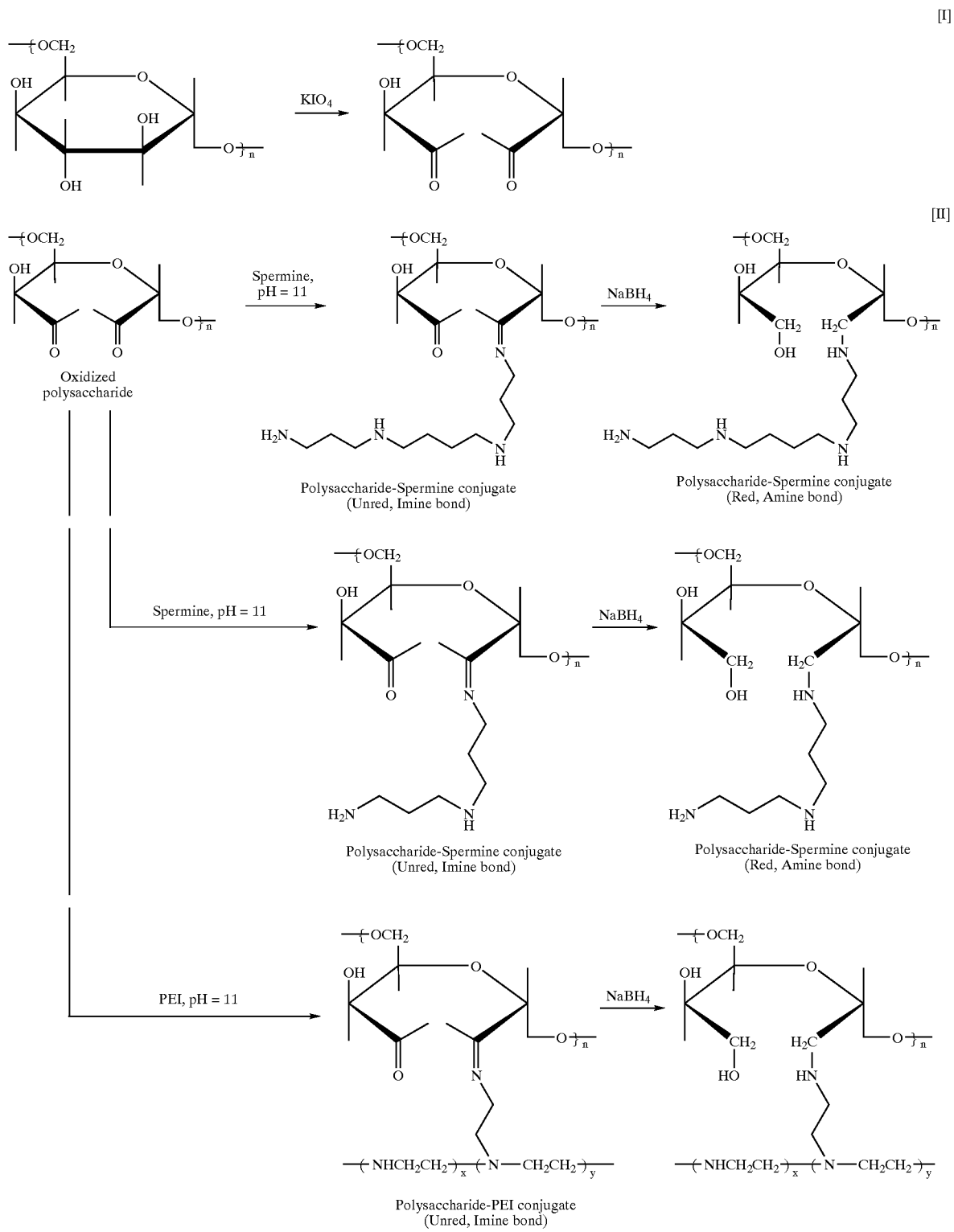

Grafting of Hydrophobic or Amphiphilic Residues.

The attachment of hydrophobic or amphiphilic residues can be carried-out by various methods adopted from the literature (for example, Y. Takakura, et al. Control of pharmaceutical properties of soybean tyrosine inhibitor by conjugation with dextran I: synthesis and characterization, J. Pharm. Sci. 78, 117–121, 1989; G. H. Hermanson, Bioconjugate techniques, Academic Press, 1996). The following methods were used by the present inventor.

The hydrophobic residue was generally conjugated by an ester, amide, imine, amine, urethane or carbonate bonds depending on the availability of the functional groups on the conjugated component. For example, fatty acids such as hexanoic acid or oleic acid are bound to hydroxyl or amine groups on the polymer carrier using activated acids such as anhydride or acid chloride derivatives or activating agents such as dicyclohexylcarbodiimide (DCC) and its derivatives that are more suitable for aqueous mediums. Alternatively, hexyl or oleyl alcohols or amines have been conjugated via carbonate or urethane bonds using phosgene derivatives. Polyethylene glycol oligomers and derivatives were conjugated either directly via the hydroxyl end or by converting the hydroxyl end group to a carboxylic acid (by reacting the alcohol with succinic, glutaric or maleic anhydride) or to a reactive epoxide group (by reacting with epichlorhydrine). The grafting reactions are conducted in hydrophilic solutions where the polymer carrier is soluble in or at least dispersed in fine particles with large surface area. Typical mediums are dimethylformamide (DMF), N-methylpyrrolidone, dimethylsulfoxide (DMSO) and their mixtures with water.

The amount of grafting suitable for cell penetration and transfection is in the range of 1 to 10% of the repeated units building the polymer carrier, i.e. saccharide units. This amount is dependent on the nature of the attached group, the nature of the final product and the polymer carrier.

In a typical experiment Triton-X100 (7 g, 10 mmol) was dried by azeotropic distillation with toluene. After solvent evaporation, SnCl4 (51.4 g, 15 mmol) and the mixture was kept at 100° C. overnight. The solvent was evaporated and mixed with ether and extracted with cold 1N NaOH. The etheric layer was dried over MgSO4 and evaporated to dryness to yield the epoxy terminated Triton (70% yield). The product was identified by TLC (silica, toluene:chloroform) and by H NMR (aromatic protons 5.9–6.7 ppm).

Alternatively, dry Triton-X100 was reacted with succinic anhydride (1:1.1 mole ratio) in toluene at reflux overnight to yield the corresponding succinate derivative as determined by H-NMR, IR and titration.

The chloroformate derivative of Triton was prepared from the reaction of the hydroxyl terminal with diphosgene using known procedures. Grafting of these functionalized Triton was conducted in DMF or DMF:water solutions under the proper conditions. For example, epoxide terminated Triton (0.5 g) was reacted with dextran (2 g) in 1N NaOH (10 ml) overnight at room temperature. The polymer was purified by dialysis against water and lyophilization. The derivatization rate was about 5% of the saccharide groups.

Carboxylic acid Triton-X100 reacted with arabinogalactan in a mixture of DMF and water using water soluble DCC. Chloroformate Triton was reacted with a suspension of polysaccharides in dry DMF for 3 days at room temperature. Triton was reacted in access relative to the saccharide groups in order to obtain a 5% conjugation.

Similar procedures were applied for the conjugation of methoxy-PEG-OH or Lipo-PEG (a diblock polymer of a fatty acid such as stearyl, oleyl or hexanoyl groups with $(PEG)_{10-100}$).

The conjugation of highly hydrophobic residues such as fatty acids and cholesterol to hydrophilic polysaccharides was conducted in an organic solvent such as DMF or DMSO, the conjugation yield was low (1–5% of saccharide units) but suitable for gene formulation.

Hydrophobic or amphiphilic residues were conjugated to oxidized polysaccharide via an amine or imine bonds. In this cases, the hydroxyl terminal of Triton and PEG derivatives were converted to amino terminals by esterification with glycine or alanine or by replacing the hydroxyl group with an amine using the tosylate/ammonia procedure as described below for the amination of polysaccharides.

The amine terminated PEG derivatives, cholesteryl amine or fatty amines are reacted with oxidized polysaccharides in basic buffer solutions (pH9–11) or mixtures of DMF with water over night, similar to the procedures used for the grafting of spermine. The grafting can be conducted during the conjugation of the oligoamines by adding both the oligoamine and the amphiphilic derivative to the reaction mixture. The imine derivatives were hydrogenated to the corresponding amine bond using NaBH4 in water for 24 hours at room temperature.

Synthesis of Oligoamine Graft Polymers

1) AG-PEI, via Imine and Amine Bonds (1.25 per 1 unit)

0.5 g. of oxidized Arabinogalactan (1:5, ~0.5 mmoles of aldehydes) and 0.18 g. of PEI (0.625 mmol) were dissolved in 20 ml borate buffer (0.1M, pH=11). The solution was mixed at room temperature for 48 h. Half of the solution (10 ml) was dialyzed against DDW using 12,000 cut-off cellulose tubing and lyophilized to obtain the imine conjugate which was insoluble in water. The other half was reacted with excess sodium borohydride at room temperature overnight, dialyzed against DDW and lyophilized to obtain the amine conjugate which was soluble in water.

aldehyde/PEI (1:1.25, mole ratio).

2) Dex-PEI, via Imine and Amine Bonds (Low PEI Content, 1 to 7.5 units)

0.3 g. of oxidized Dextran (1:1, 1.875 mmole of aldehydes) and 0.15 g. of PEI (0.25 mmol) were dissolved in 20 ml borate buffer (0.1M, pH=11) and mixed at room temperature for 48 h. The solution was treated as above to yield the pure imine and amine conjugates.

aldehyde/PEI (7.5:1, mole ratio).

3. AG-Spermine, via Imine and Amine Bonds (Low Oxidation, Low Spermine Content)

0.5 g. of oxidized AG (1:5, 0.375 mmole aldehyde) and 0.08 g. of spermine (0.38 mmole) were dissolved in 20 ml buffer borate (0.1M, pH=11) and mixed at room temperature for 48 h. The solution was treated as above to yield the pure imine and amine conjugates.

aldehyde/Spermine (1:1, mole ratio).

4) Dex-Spermine, via Imine and Amine Bonds 0.25 g. of oxidized Dextran (1:1, 1.56 mmole aldehyde) and 0.1 g. of Spermine (0.5 mmole) were dissolved in 20 ml buffer borate (0.1M, pH=11) and mixed at room temperature for 48 h. The solution was treated as above to yield the pure imine and amine conjugates.

aldehyde/Spermine (3:1, mole ratio).

5) Dex-Spermidine, via Imine and Amine Bonds 0.5 g. of oxidized Dextran (1:1, 3.125 mmol aldehyde) and 0.2 g. of Spermidine (1.37 mmole) were dissolved in 20 ml borate buffer (0.1<, pH=11) and mixed at room temperature for 48 h. The solution was treated as above to yield the pure imine and amine conjugates.

aldehyde/Spermidine (2:1, mole ratio).

6) Amination of Dextran 1.0 g. of oxidized Dextran (1:1, 6.25 mmole aldehyde) were dissolved in 100 ml concentrated ammonium hydroxide (25% ammonia). The solution was mixed at room temperature for 2 days and excess sodium borohydride were added and the solution was stirred for another 24 h under the same conditions. Excess ammonia was evaporated and the polymer solution was dialyzed against DDW and lyophilized to dryness.

7) Dex-Spermine, via Imine and Amine bonds-obtained by High Dilution 0.2 g. of oxidized Dextran (1:1, 1.25 mmole aldehyde) and 0.2 g. of Spermine (1.0 mmole) in 200 ml borate buffer (0.1M, pH=11) and mixed at room temperature for 3 days then excess lysine (0.5 g.) was added to saturate excess aldehydes and the mixture was further mixed under the same conditions for another 24 h. The solution was treated as above to yield the pure imine and amine conjugates.

aldehyde/Spermine (1.25:1, mole ratio).

8) Dex-Spermidine, via Imine and Amine bonds-obtained by High Dilution

The same procedure and amounts used in (7) but using Spermidine instead of Spermine. The imine and amine conjugate obtained were soluble in water.

aldehyde/Spermidine (1:1, mole ratio)

9) AG-PEI, via Imine and Amine bonds-obtained by High Dilution 0.5 g. of oxidized AG (1:1, 1.875 mmole of aldehyde) and 1.2 g. of PEI (2 mmole) were dissolved in 1.0 liter borate buffer (0.1M, pH=11) and mixed at room temperature for 3 days. Excess lysine (1.0 g.) was added to the solution to saturate excess unreacted aldehydes and further mixed under the same conditions for another 24 h. The solution was treated as above to yield the pure imine and amine conjugates.

aldehyde/PEI (~1:1, mole ratio).

10) Dex-Spermine, via Imine and Amine Bonds (High Oxidation and Spermine Content)

0.5 g. Dextran (1:1, 3.125 mmole aldehyde) and 0.25 g. Spermine (1.25 mmole) were dissolved in 40 ml borate buffer (0.1M, pH=11) and mixed at room temperature for 2 days. The solution was treated as above to yield the pure imine and amine conjugates.

aldehyde/Spermine (2.5:1, mole ratio).

11) AG-Spermine, via Imine and Amine Bonds 0.5 g. of AG (1:5, 0.375 mmole aldehyde) and 0.25 g. Spermine (1.25 mmole) were dissolved in 40 ml borate buffer (0.1M, pH=11) and mixed at room temperature for 2 days. The solution was treated as above to yield the pure imine and amine conjugates.

aldehyde/Spermine (3.3:1 mole ratio).

12. Pullulan-Spermine, via Imine and Amine Bonds (High Oxidation and Spermine Content)

0.5 g. of oxidized Pullulan (1:1, 3.125 mmole assuming 50% oxidation) and 0.25 g. Spermine (1.25 mmole) were dissolved in 40 ml borate buffer (0.1M, pH=11) and mixed at room temperature for 2 days. The solution was treated as above to yield the pure imine and amine conjugates.

aldehyde/Spermine (2.5:1, mole ratio).

13) PUL-Spermine, via an Amine Bond 0.25 g. of oxidized pullulan (1:1, 1.56 mmole aldehyde assuming 50% oxidation) and 0.25 g. Spermine (1.25 mmole) were dissolved in 40 ml borate buffer (0.1M, pH=11) and mixed at room temperature for 48 h. Excess borohydride was added and further mixed under the same conditions for another 24 h. The solution was treated as above to yield the pure imine and amine conjugates.

aldehyde/Spermine (~1:1, mole ratio).

EXAMPLE 2

Conjugation of Spermine via the Secondary Amine

In order to graft spermine and similar oligoamines via the secondary amine while leaving the primary amine intact, the following strategy was used. The primary amines were specifically protected by a carbobenzoxy group using a mildly active carbobenzoxy-imidazole. The protected oligoamine was then grafted on dextran or arabinogalactan by reacting the agent with the tosylated or mesylated polysaccharide derivatives. The protecting groups were then removed by a common procedure used for protecting amino acids. The amount of primary amines in the polymer was determined by the fluorescamine or TNBS methods.

Synthesis of $N^1$—$N^{12}$-dicarbobenzoxy Spermine

1) Synthesis of Carbobenzoxy Imidazole:

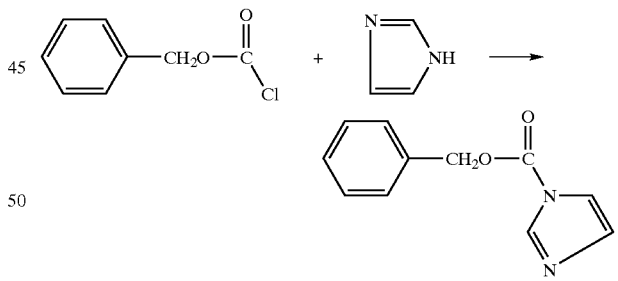

Benzyl chloroformate (10.0 g., 58.66 mmol.) in dry DCM was cooled to 0° C. (ice bath), and a solution of imidazole (8.0 g., 117.5 mmol.) in 90.0 ml dry DCM was added dropwise under a nitrogen atmosphere. The reaction mixture was allowed to warm up to room temperature and further stirred for 30 min. The reaction mixture was diluted with DCM and washed 3 times with 10% citric acid (3×100 ml). The organic layer was separated and dried over $MgSO_4$, filtered and evaporated to give a colorless oil. The yield was 90%.

$^1$H-NMR ($CDCl_3$): 5.38 (s, 2H) and 7.00–8.26 (m, 8H) ppm.

2) Synthesis of $N^1$—$N^{12}$-dicarbobenzoxy Spermine.

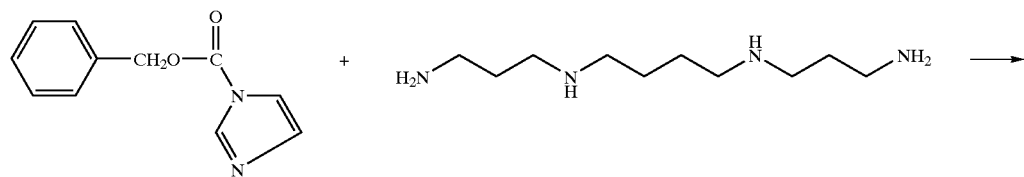

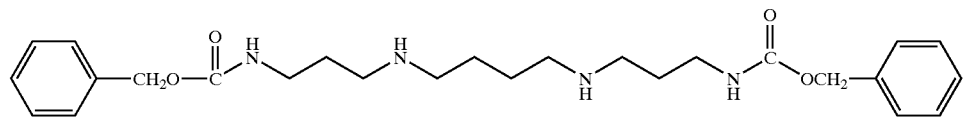

200.0 mg of carbobenzoxy imidazole in 5.0 ml anhydrous DCM and 20.0 mg of DMAP were cooled to 0° C. under nitrogen atmosphere. 200.0 mg of spermine was added dropwise in 5.0 ml dry DCM. The solution was stirred for 1 h. at 0° C. and over night at room temperature. The solvent was evaporated in vacuum, re-dissolved in 20.0 ml ethylacetate and washed twice with 10% citric acid (2×10 ml) and with DDW (2×10 ml). The organic layer was separated and dried over $MgSO_4$, filtered and evaporated to dryness to yield a colorless solid. The solid was suspended in n-hexane, filtered and washed with n-hexane (20 ml) and dried over night in vacuum over $P_2O_5$. The yield was 60%.

$^1$H-NMR ($CDCl_3$): 1.4–1.7 (m, 20H; hydrogens of spermine), 5.132 (s, 4H; methylene group of benzyl) and 7.2–7.4 (m, 10H; aromatic hydrogen of benzyl group) ppm.

1) Conjugation of $N^1$—$N^{12}$-dicarbobenzoxy Spermine to Dextran/AG via Amine Formation:

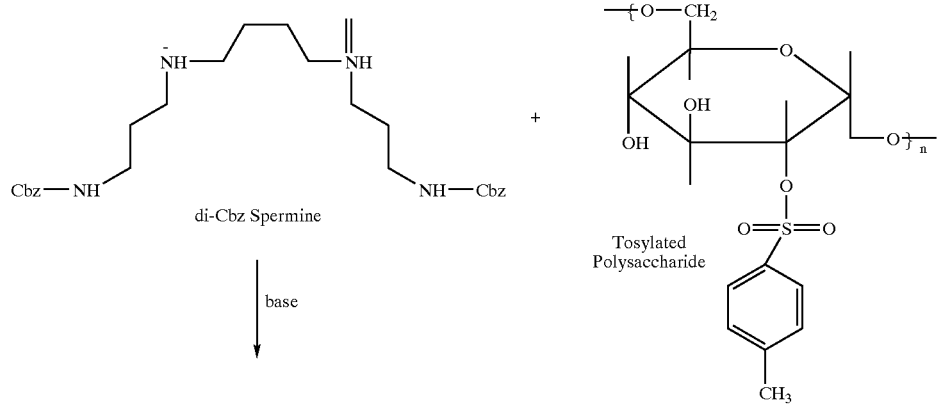

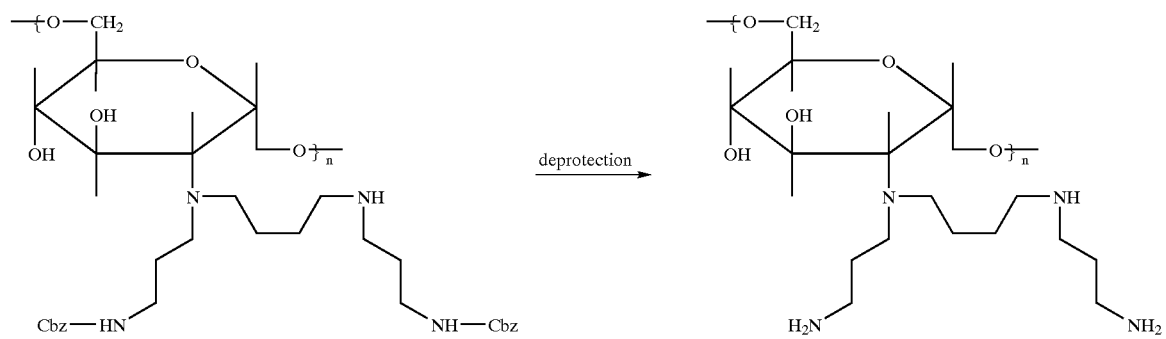

The tosylated polymer and the protected spermine were dissolved in DMF and mixed under basic conditions (excess triethyl amine) at room temperature for two days to yield the grafted polymer and the protecting groups were removed in HBr in acetic acid.

2) Synthesis of $N^1 N^{12}$-bis(trifluroacetyl) Spermine:

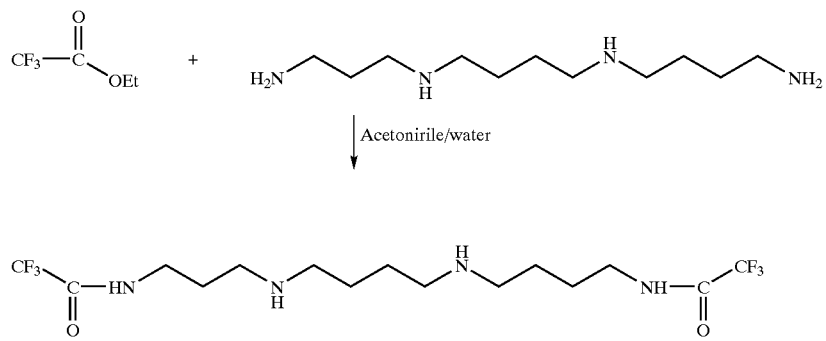

Spermine (5 mmole) in acetonitrile (15 ml) was added ethyl trifluroacetate (25 mmole) and water (12 mmole). The solution was refluxed overnight and the solvent removed to give a buff-colored solid which was washed DCM yielding $N^1, N^{12}$-bis trifluroacetyl spermine as a pale yellow-colored solid in good yield (95%). The solid was recrystallized from ethyl acetate to give a white solid.

The protected spermine was attached to the tosylated polysaccharide as described earlier and the trifluroacetyl group was removed in concentrated ammonia in methanolic solution.

3) Synthesis of mono-(trifluroacetyl) Spermine:

Spermine was selectively protected on a primary amino functional group by reaction with triethyl fluroacetate (1.0 eq., MeOH, −78° C. for 1 h then 0° C. over 1 h), to afford a mixture containing predominately mono-trifluroacetamide but also di-trifluroacetamide. The mono-protected spermine was purified from the di-protected spermine by column chromatography over silica gel (DCM-MeOH-conc. NH$_4$OH 70:10:1 to 50:1:1 v/v/v).

The mono-protected amine was then attached to di-aldehyde polysaccharides using a mild basic buffer as a solvent (pH=8.0). The imine conjugates which were obtained were reduced by borohydride and the Tfa protecting group was removed using concentrated ammonia. The conjugate obtained was purified by dialysis using 12,000 cut-off cellulose tubing against DDW and lyophilized to dryness. This method minimized crosslinking and branching between polymer chains and produced a maximum degree of concentration of free amine functionality.

EXAMPLE 3

Conjugation of Spermine to Polysaccharide via Amide Linkage

Di-aldehyde polysaccharide was treated with sodium chlorite overnight and purified by anion exchange chromatography (DOWEX-50) to obtain the di-carboxylate form. Carboxylate content was determined by titration and found to be 40% (saccharide units). The polymer was lyophilized to obtain a white solid in good yields.

1.0 eq. of each the anhydrous polymer and spermine were dissolved in dry DMF and a catalytic amounts of DMAP (0.1 eq.) were added. The polymer solution was cooled to 0° C. and 1.5 eq. of EDC were added. The mixture was stirred overnight under nitrogen atmosphere and DMF was removed in vacuum. The residue was re-dissolved in water and purified by dialysis and lyophilized to dryness. The spermine content attached to the polymer was determined by elemental analysis of nitrogen.

EXAMPLE 4

Conjugation of mono-protected Spermine to di-carboxylate Polysaccharide 1.0 eq. of each di-carboxylate polysaccharide and mono-trifluroacetamide spermine were dissolved in dry DMF containing a catalytic amount of DMAP (0.1 eq.). The mixture was cooled to 0° C. and 1.5 equivalents of EDC were added. The mixture was stirred overnight under nitrogen atmosphere and the DMF was removed under vacuum. Small amount of water were added to destroy excess EDC and the protecting group (trifluro acetate) was removed by treating the solution with concentrated ammonia solution. Excess ammonia was removed in vacuum and the mixture was dialyzed against DDW and lyophilized to dryness. Spermine content was determined by elemental analysis of nitrogen and TNBS method.

EXAMPLE 5

Polycation Synthesis

Polycations were prepared by the known reductive amination synthesis between primary amines and aldehydes. In brief, 1.0 equimolar aldehydes of the desired polysaccharide dissolved in ddw, was added dropwise to a stirred solution containing 1.1 equimolar oligoamine [spermine, spermidine, oligoethyleneimine (mw=600), oligolysine (mw=1000), ethanediamine, butanediamine, and lysine and ornithine alkylesters], dissolved in borate buffer (0.1 m, ph=11.0). The rate of addition was not allowed to exceed 5.0 ml/h to minimize branching and to facilitate the grafting of the oligoamine chains onto the polymer backbone. This conjugation reactions were conducted under nitrogen atmosphere to minimize oligoamine oxidation. The mixture was stirred for 24 h and then excess sodium borohydride (1 equimolar to the starting aldehyde content) were added and further stirred for another 24 h under the same conditions. The conjugate mixture was then dialyzed against double distilled water (DDW, 3.5 k MWCO) overnight at 4° C. and lyophilized to dryness under reduced pressure. The reduced conjugate powder was further de-salted by column chromatography using sephadex g-10 crosslinked beads and double distilled water (DDW) as eleunt. Fractions containing the product (revealed by the ninhydrin test) were collected and further lyophilized to obtain the yellowish last-form product in 60% overall yield. Various polycations prepared by the above procedure were characterized by elemental analysis of nitrogen, quantitative determination of primary amine by the TNBS method and molecular weight of conjugates using gel permeation chromatography (GPC). Nearly 100 different polycations were prepared and analyzed. Table 2 summarizes representative polycations prepared from various polysaccharides and oligoamines:

separately to each well in culture plates (6 wells per culture plate). Each well contains approximately $1.25 \times 10^5$ cells. Cells were preincubated for 24 h prior transfection. Polymers (table 1) were dissolved separately in DDW to give a 5 mm concentration of amines (determined by elemental analysis of nitrogen). 1 mm solutions were prepared by diluting the mother liqueur of each polycation with phosphate buffer solution (PBS).

Solutions of DNA (PHGH-CMV) and polycations at various charge ratios (0.025 to 2, −/+) were mixed, diluted to a final volume of 180 µl with PBS and left to stand at room temperature for at least 30 min.

The medium was then removed from wells and 1.0 ml of serum-free medium was added. After, 50 µl of complex (DNA-polycation) were added separately to each well (50 µl=5 nmole phosphate equivalent to 1.62 µg plasmid per well). The cultures were then incubated for 4 h, replacement of serum-free medium in fresh complete-medium and incubation for 20 h. The supernatants of wells were then collected separately and assayed for human growth hormone (HGH) protein (HGH elisa kit). DOTAP:chol (1:1), a commercial cationic lipids, was used as reference.

TABLE 2

REPRESENTATIVE POLYCATIONS PREPARED BY CONJUGATION OF VARIOUS POLYSACCHARIDES AND OLIGOAMINES.

| CODE | CONJUGATE COMPOSITION | OLIGOAMINE/ ALDEHYDE (MOLE RATIO) | % N | NMOLE AMINE/MG CONJUGATE (TNBS) | INITIAL MW OF STARING POLYALDEHYDE (GPC) | MW OF CONJUGATE (GPC) |
|---|---|---|---|---|---|---|
| TA1-38-2 | AG-PEI600 | 0.6 | 6.14 | ND | 19,960 | ND |
| TA1-57-1 | AG-PEI600 | 1.0 | 12.19 | ND | 19,960 | ND |
| TA1-127B | AG-SPERMINE | 1.5 | 2.66 | 262 | 19,960 | ND |
| TA1-127A | AG-SPERMINE | 1.5 | 3.91 | 482 | 19,960 | ND |
| TA1-126A | AG-SPERMINE | 1.5 | 8.31 | 825 | 19,960 | ND |
| G1-TA-39A | P-SPERMINE | 1.5 | 9.15 | ND | ND | ND |
| G1-TA-39B | P-SPERMINE | 1.5 | 1.91 | ND | ND | ND |
| * G1-TA-129A | D-SPERMINE | 1.5 | 11.19 | 1050 | 27,500 | 6,165 |
| * G1-TA-6A | D-SPERMINE | 1.5 | 10.37 | 930 | 27,500 | 7,080 |
| * G1-TA-35/1 | D-SPERMINE | 1.5 | 10.84 | 810 | 27,500 | 8,255 |
| * G1-TA-40/2 | D-SPERMINE | 1.5 | 7.65 | 920 | 27,500 | 6,380 |
| * G1-TA-43A | D-SPERMINE | 2.0 | 12.77 | 1850 | 27,500 | 5,815 |
| * SEPH17 | D-SPERMINE | 1.5 | 9.91 | 960 | 27,500 | 9,940 |
| * SEPH18 | D-SPERMINE | 1.5 | 10.4 | 1100 | 27,500 | 9,610 |
| * SEPH19-22 | D-SPERMINE | 1.5 | 11.01 | 1880 | 27,500 | 6,180 |
| G1-TA-52A | D-SPERMINE | 1.5 | 10.76 | 740 | 27,500 | 18,570 |
| G1-TA-52C | D-SPERMINE | 1.5 | 11.52 | 860 | 27,500 | 20,870 |
| G1-TA-57 | D-SPERMINE | 1.5 | 10.83 | 820 | 27,500 | 15,390 |
| G6-AR-1A | D-SPERMINE | 1.5 | 10.6 | 770 | 52,690 | 35,405 |
| G6-AR-4 | D-SPERMINE | 1.5 | 10.6 | 825 | 52,690 | 21,220 |
| G6-AR-15 | D-SPERMINE | 1.5 | 11.73 | 1450 | 13,950 | 10,000 |
| G4-TA-10A | D-SPERMINE | 1.5 | 11.87 | 1490 | 13,950 | 11,000 |
| H-9300A | D-SPERMINE | 1.5 | 12.09 | 1340 | 8,820 | 4,000 |
| H-9300B | D-SPERMINE | 1.5 | 11.77 | 1440 | 8,820 | 3,000 |

* CONJUGATES MARKED WITH * WERE FOUND TO BE HIGHLY ACTIVE (AT LEAST 40% OF THE ACTIVITY OBTAINED WITH CA PHOSPHATE) IN TRANSFECTING CELLS.

Transfection Efficacy:

1) Transfection of NIH-3T3 Cells Using Human Growth Hormone Plasmid (PHGH-CMV):

For transfection studies we used NIH-3t3 cells. Briefly, 1.0 ml of cells in complete medium dmed was added Around 100 different polycations (including the polymers described in table 2) were separately tested in NIH-3t3 cells at different charge ratios. Most of the polycations showed some activity while those prepared from dextran and spermine (table 2, marked with *) were the most active. These unique polycations were prepared from dextran (50% oxidation and 27,500 in molecular weight of the starting polyaldehyde) and spermine as the grafted oligoamine. The transfections efficacy of the two most active polycations (TA1–129a and G1-TA-6) released 25 and 28 ng/ml of growth hormone while the reference lipid, dotap-cholesterol released 17 ng/ml HGH.

These polycations (TA1–129a and G1-TA-6) were found to be mostly active when used with excess positive charge ratio (0.1 to 0.05 −/+). The reason for the need of large excess of positive charge is probably related to polycation structures. Comparing the spermine content of active polycations by both elemental analysis and tnbs (table 2), showed that these structures are very branched and around 50% of oligoamine molecules are attached to polymer chains from both sides. This branching resulted in high percentage of secondary amines, which are not totally charged under physiological conditions. Therefore, complexation with polynucleotides will most likely occur between primary amines and phosphate groups.

Transfection of HEK293 Cells Using GFP Plasmid:

For this study HEK cells were used. Briefly, 24 wells were covered with polyethylene imine (PEI) alcoholic solution. Day prior transfection, cells were placed in wells and counted (approximately $1 \times 10^5$ cells per well). Complexes of DNA/polymer were prepared at five different molar charge ratios (0.5 to 0.05, −/+). In all complexes prepared, a constant weight of DNA (0.5 μg) was used from stock solution of 0.322 mg/ml in DDW. All complexes were added to wells in the presence and absence of glycerol. Glycerol is a useful reagent for facilitating complex uptake through cell membrane. For control experiments, calcium phosphate and the commercial TRANSFAST® (promega) cationic liposome were used. The complexes and controls were incubated with the cells for 72 h and then visualized by inverted fluorescent microscope and the number of green cells were counted and compared to the control.

| polymer | % transfection |
|---|---|
| polyethyleneimine mw = 30,000 | 4 |
| polyethyleneimine mw = 600,000 | 2 |
| dextran-spermine amine bond, | 12 |
| dextran-spermine amine bond | 15 |
| dextran-spermine amine -ta1-129a | 45 |
| dextran-spermine amine -he-100 | 45 |
| dextran-spermine amine -ta1-200 | 35 |
| pullulan-spermine-amine bond | 10 |
| pullulan-spermine-imine bond | 2 |
| dextran-spermine imine bond | 1 |
| calcium phosphate (reference) | 48 |

As can be seen from Table 2, conjugate ta1–129a (dextran-spermine) was the most active (around 45% of cells were tranfected). Conjugates composed of arabinogalactan and pullulan (AG-spermine and PUL-spermine) were also active but at a lesser extent (<15%). Conjugates composed of PEI oligoamines and those who are not reduced (imine bond) were less active.

The most active conjugate (TA1–129a) was tested again in the same in-vitro system and found to be active even without glycerol shock.

Different polycations were prepared starting from various polysaccharides and oligoamines. Polysaccharides used in this study were the branched arabinogalactan (20 kd), linear pullulan (~50 kd) and dextran with 9.3, 18.0, 40, 74 and 500 kd in molecular weighs. Oligoamines used were mainly spermine and spermidine, and more synthetic oligoamines, i.e. polyethyleneimine and various diamines with different lengths. Although, most of these conjugates formed stable complexes with various plasmids as determined by turbidity experiments (data not shown), only few polycations were found to be very active in transfecting cells. Good transfection were obtained in the following conditions:

Conjugates composed of reduced dextran-spermine were found to be the best active polycations compared to polycations prepared from arabinogalactan and pullulan under similar conditions.

Conjugates of dextrans containing other oligoamines (spermidine, polyethyleneimine and various diamines) were less active in transfecting cells.

Unreduced conjugates, i.e. imine bond linkage, were found to be less active in all charge ratio and polymer compositions.

Maximum transfections were obtained between 0.05 to 0.5 charge ratio (−/+).

Molecular weights of all active polycations were between 6–10 kd as determined by GPC.

Conjugates with higher molecular weights (>15 kd) showed to be less active at all charge ratios. Higher molecular weights were obtained when polycations were prepared in moderate conditions, i.e. at 4° C.

Nitrogen content of active polycations were between 9.0 to 12.0% (w/w), as determined by elemental analysis of nitrogen.

Free amino groups of active polycations were between 800 to 1500 nmole per mg conjugate as determined by TNBS method using spermine as standard.

EXAMPLE 6

Polycation Modifications

Optimal polycations were chemically modified in order to achieve a better transfection efficacy and better stability in serum solutions. These modification includes:

1) immobilization of PEG chains on the polycations backbone to protect the polycation-DNA complex against serum proteins and degrading enzymes.

2) immobilization of hydrophobic moieties on the polycation backbone on order to increase the uptake of complex into cells.

3) physical mixing of polycation-DNA complex with lipid based transfactants to obtain small and homogenous particles (lipo-polyplex).

The modified polycations can be scematically represented by the following formula:

These optimal polycations have been farther modified for better tissue specificity. These modifications include the attachment of mannose, glucose or galactose for targeting to liver tissues. Table 3 also summarizes possible ligand attachment for cell targeting:

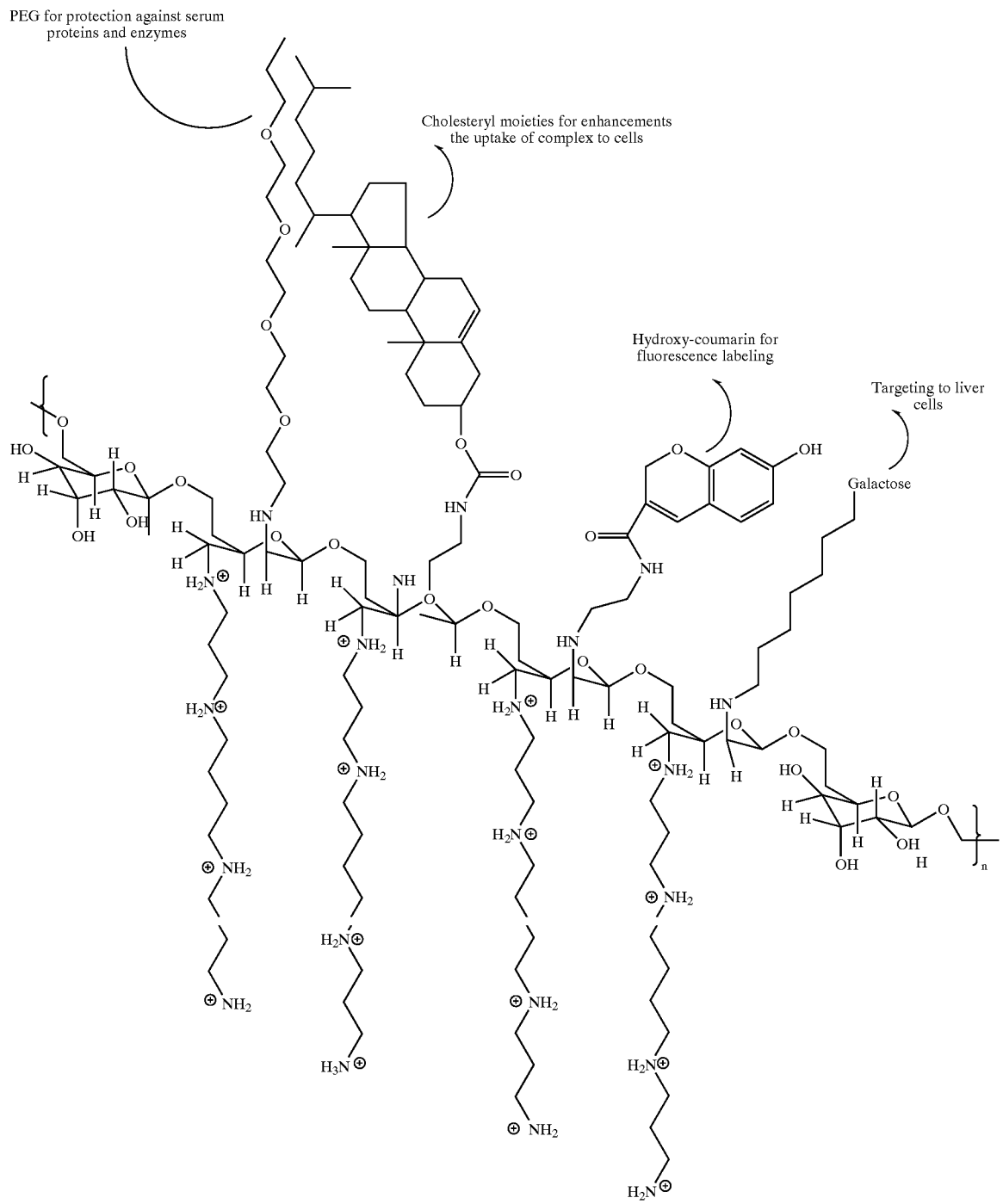
TABLE 3
EXAMPLES OF LIGAND ATTACHMENTS FOR CELL TARGETING.
| RECEPTOR | LIGAND | TARGET CELLS |
|---|---|---|
| ASGP RECEPTOR | ASIALOGLY-COPROTEINS | HEPG2, HUH-7, PRIMARY HEPATOCYTES |
| ASGP RECEPTOR | SYNTHETIC GALACTOSYLATED LIGANDS | HEPG2, BNL, CL2, HUH-7 |

TABLE 3-continued

EXAMPLES OF LIGAND ATTACHMENTS FOR CELL TARGETING.

| RECEPTOR | LIGAND | TARGET CELLS |
| --- | --- | --- |
| TRANSFERRIN RECEPTOR | TRANSFERRIN | K562, J2E, F-MEL, HELA, CFT-1, MRC-5, NIH3T3, MELANOMA, NEUROBLASTOMA, FIBROBLASTS EPITHELIAL CELLS, ENDOTHELIAL CELLS |
| INSULIN RECEPTOR | INSULIN | PLC/PRF/5 (HEPATOMA) |
| FGF2-R | BASIC FGF | COS-1, NIH3T3, BHK, B16 |
| FOLATE RECEPTOR | FOLATE | KB, HELA, CACO-2, SW620, SKOV |
| CARBOHYDRATES | LECTINES | AIRWAY CELLS, MUSCLE CELLS |

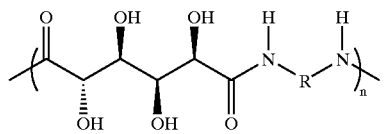

EXAMPLE 7

Grafting of Oligoamine on Aldaric Acid Based Polysaccharides

Spermine and PEI oligoamines were grafted on poly (alkyl-glucaramide using the procedures described in the previous examples. Poly(alkyl-D-glucaramide) of the general structure:

Where R is an alkyl, ethylene glycol oligomer or an alkylamine oligomer; was obtained from Avanti (Albaster, Ala., USA) or synthesized by the procedure described in Keily et al. Hydroxylated nylons based on unprotected esterified D-glucaric acid by simple condensation reaction, J. Amer. Chem. Soc. 116, 571–578, 1994). Grafting of an oligoamine to this polymer was carried-out by the tessellation method. In a typical experiment, 50 mg of poly(ethylene-D-glucaramide) was dissolved in 4 ml DMF containing 195 mg triethylamine.

A solution of tosyl-chloride (122 mg) in 2 ml DMF was added to the mixture. The solution was left overnight under argon. DMF is evaporated and the residue is purified by precipitation in ether from a dichloromethane solution. H NMR analysis showed an average of 0.8 tosyl units per monomer unit. This tosylated polymer was reacted with two equivalents of spermine in diluted solution of borate buffer pH9 for three days at room temperature to obtain substitution of the tosyl groups with spermine groups as determined by elemental analysis and TNBS method.

EXAMPLE 8

Encapsulation of DNA-polycation Complex in Biodegradable Polymers

The Plasmid-polycations of example 3 were encapsulated in a biodegradable microsphere for the purpose of controlled release of the plasmid complex in a specific site in the body. The polymers used for the encapsulation were polymers based on lactide and glycolide and polyanhydrides. Known encapsulation processes such as coaservation and solvent evaporation were used. Methods for encapsulation of bioactive compounds have been described in the literature for example: *Nanosphere Delivery Systems*, S. Benita, Ed. Marcel Dekker, 1996; *Microparticulate Systems for Drug Delivery*, H. Berstein and S. Cohen, Eds., Marcel Dekker, 1996.

The plasmid-complex described in Table 1 (7a) above was isolated from the aqueous solution by lyophilization and the powder was used for encapsulation using the solvent evaporation process as follows: to a PLA (MW=2500) solution (100 mg in 0.5 ml dichloromethane), the lyophilized plasmid complex was dispersed using a sonicator. This dispersion was emulsified in about 1 ml 2% polyvinyl alcohol (PVA) in water. The concentrated dispersion was added to 10 ml 0.2% PVA solution and the mixture was mixed vigorously for about five hours at room temperature where microspheres were formed. The particles were isolated by filtration and washed with water and dried. In vitro release was conducted in phosphate buffer pH7.4.

EXAMPLE 9

Conjugation of Quaternary Ammonium Alkanamines and Spermine to Polysaccharides

The synthesis of mono-quaternary ammonium alkanediamine and spermine is described in scheme a and b. The method involve the selective protection and de-protection of the other amine to guarantee a single quaternization and leaving a primary amine for conjugation to the oxidized polysaccharide via an inime or an amine bond or conjugation by other bonds including amidation to carboxylic acid containing natural or modified polysaccharides (hyaluronic acid, carboxymethyl cellulose, and super oxidized polysaccharides). These mono primary amine derivatives attach to the polysaccharide from one side only preventing the possibility of branching or crosslinking as was commonly found when using oligoamines with two primary amino moieties.

Using this protection-deprotection method, oligoamines were conjugated to polysaccharides with minimal branching as only one primary amine is available for conjugation at time of conjugation and after conjugation the protecting group is released to form a free primary amine.

EXAMPLE 10

Conjugation of Oligoamine to Chitosan

Chitosan is a seminatural polysaccharide based on glucoseamine chain connected by 1,4 glycosidic bond. The conjugation is made by the reaction between the bromoalkyl derivative of an oligoamine on the amino group of the glucose amine units of the chitosan.

Synthesis of Bromo Derivative of Quaternaized Spermine
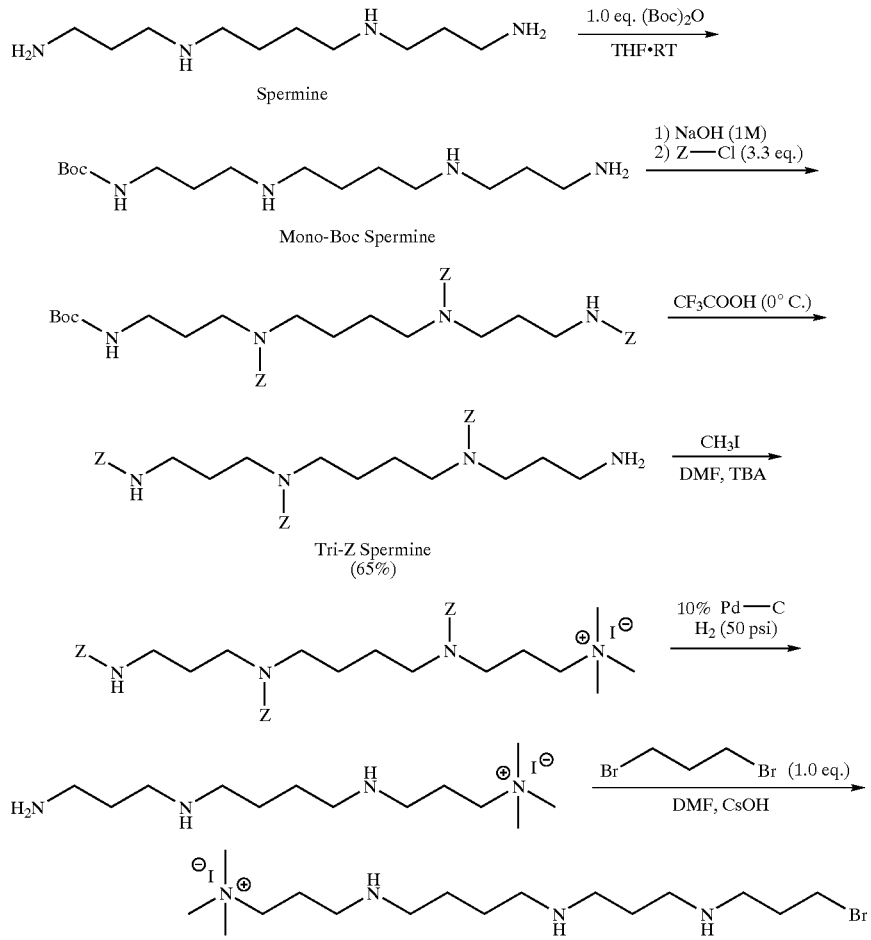
Conjugation of Modified Spermine to Chitosan Via Alkylation
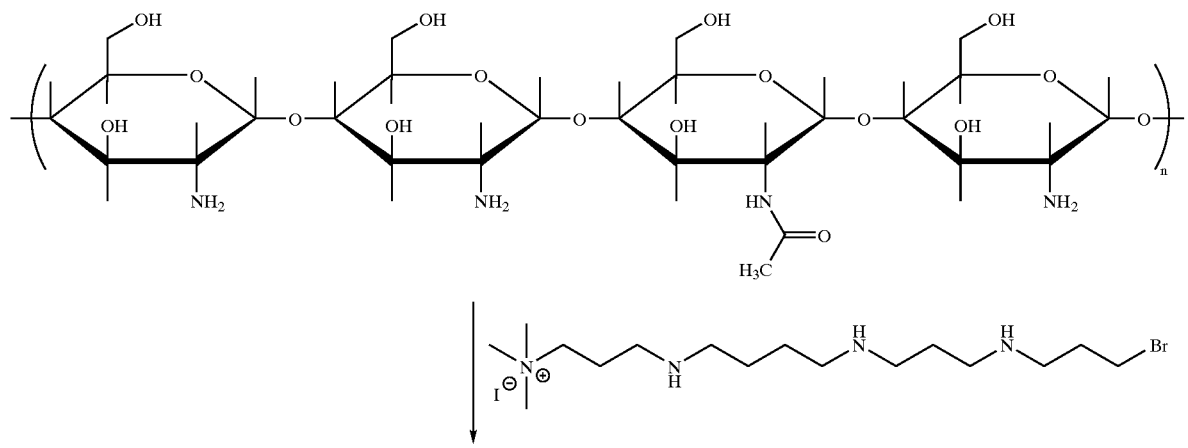

-continued

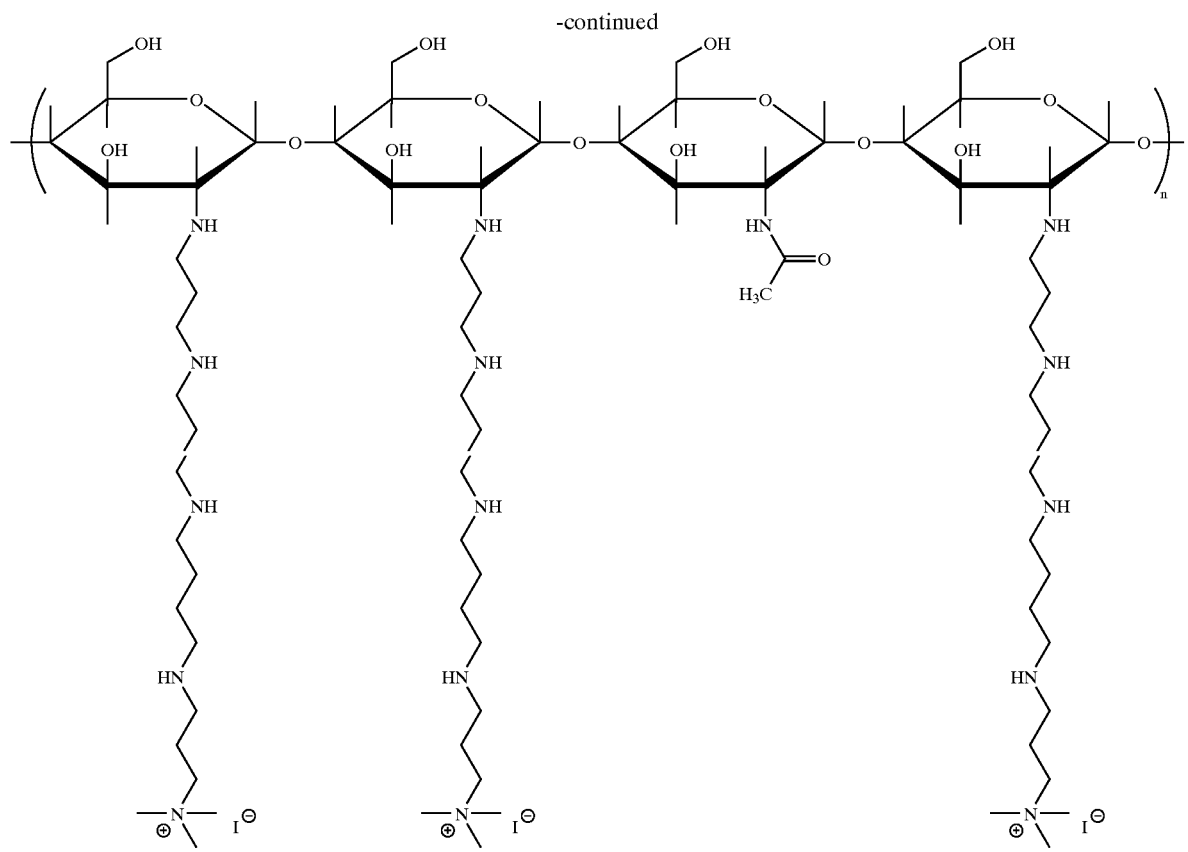

EXAMPLE 11

Conjugation of Oligoamine to Selectively Oxidized Primary Alcohol Groups on the Polysaccharide Dextran and arabinogalactan were oxidized specifically on the aliphatic hydroxyl (position 6) by an enzyme following a known procedure (wo 93/25239, dec. 1993; x.c. liu and j. s. dordick, jacs 1999, 121, 466–467). In a typical experiment, ten grams of arbinogalactan is dissolved in 50 ml 0.1 m phosphate buffer pH6.0. To the resultant solution is added 225 units of galactose oxidase dissolved in about 2 ml of the same buffer. Bovine catalase was added to remove hydrogene peroxide produced during the enzymatic oxidation. The reaction mixture was passed through an MB-1 resin to remove the protein as monitored by the ninhydrin test for proteins. The product was isolated by precipitation from cold absolute ethanol. The precipitate was isolated by filtration. The aldehyde groups formed in this reaction were reacted with spermine and other oligoamine to obtain the respective polycations.

Enzymatic Oxidation of Pullulan and Arabinogalactan

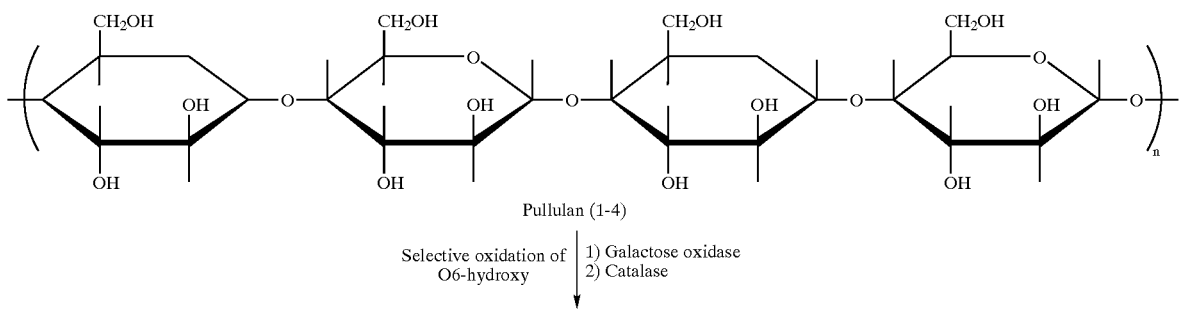

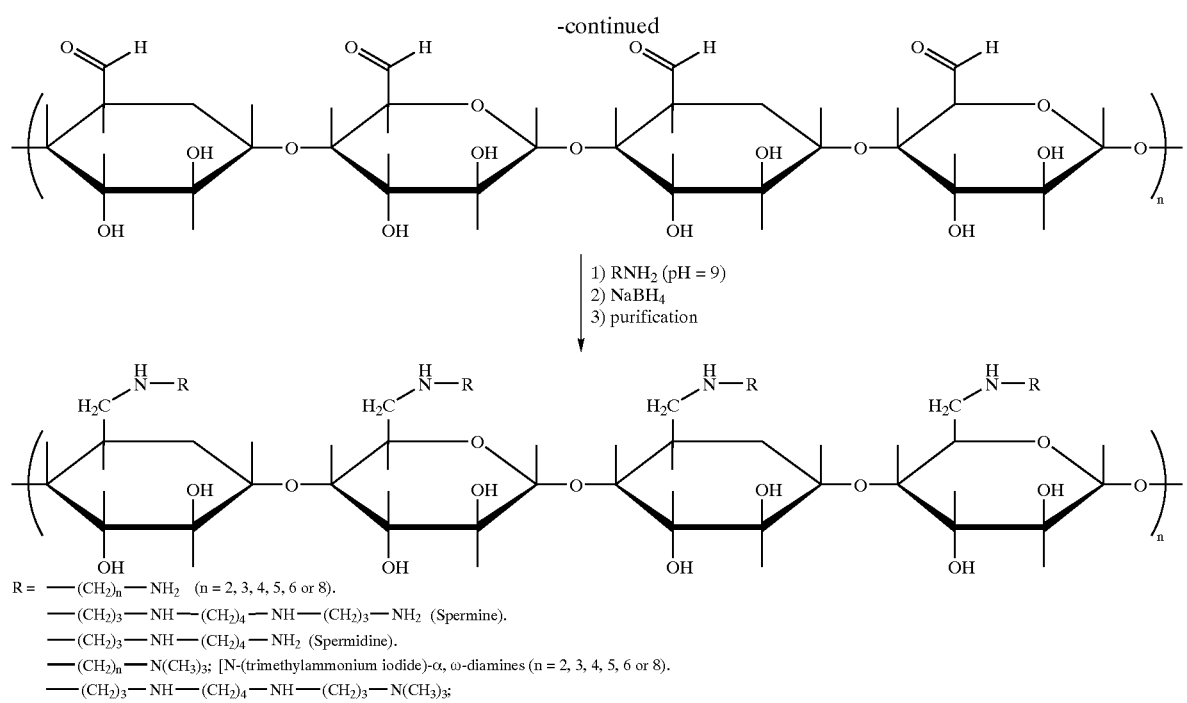

R = —(CH$_2$)$_n$—NH$_2$ (n = 2, 3, 4, 5, 6 or 8).
—(CH$_2$)$_3$—NH—(CH$_2$)$_4$—NH—(CH$_2$)$_3$—NH$_2$ (Spermine).
—(CH$_2$)$_3$—NH—(CH$_2$)$_4$—NH$_2$ (Spermidine).
—(CH$_2$)$_n$—N(CH$_3$)$_3$; [N-(trimethylammonium iodide)-α, ω-diamines (n = 2, 3, 4, 5, 6 or 8).
—(CH$_2$)$_3$—NH—(CH$_2$)$_4$—NH—(CH$_2$)$_3$—N(CH$_3$)$_3$;

EXAMPLE 12

Conjugation of Oligoamine to Peroxidized Polysaccharide

Dextran was oxidized twice, once with KIO$_4$ to form the aldehyde group followed by oxidation with chlorate to form the polycarboxylic acid. The polycarboxylic acid is conjugated by an ologoamine via an amide bond using DCC and other coupling agent.

Conjugation of Spermine to Peroxidized Dextran via Amide Formation

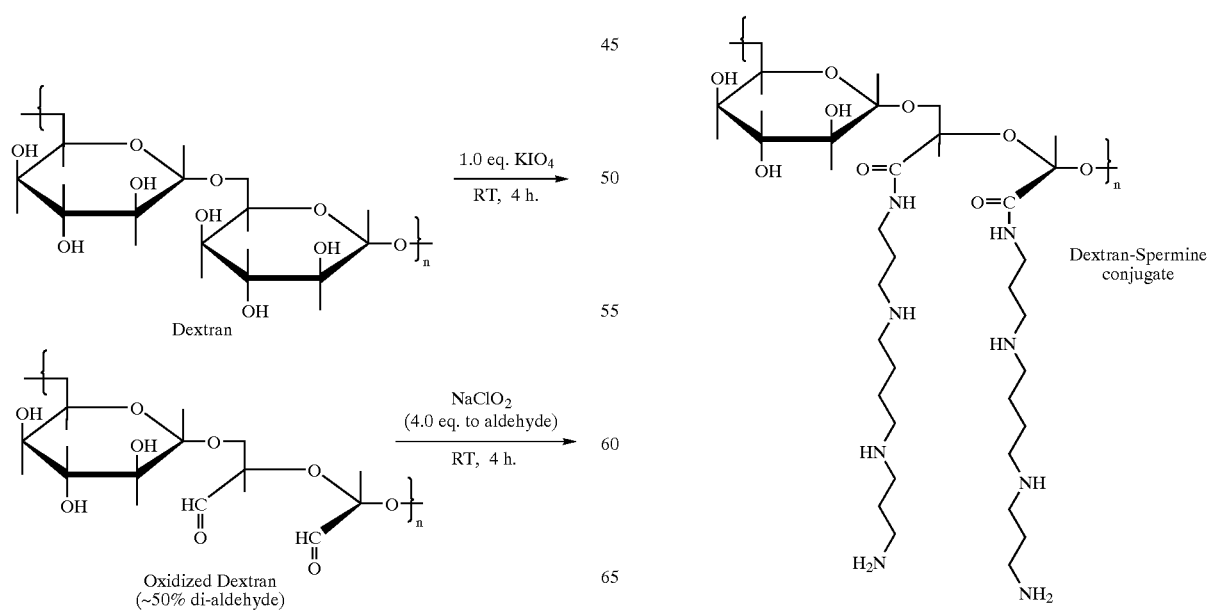

EXAMPLE 13

Oligoamine were conjugated to polysaccharides by direct amination via activation of the hydroxyl groups by tosylation. Dextran was tosylated by the reaction between a solution of dextran in water pH8.0 with a chloroformic solution of tosyl chloride and rapid mixing. The degree of tosylation was controlled by the ratio of the tosyl chloride and the hydroxyl groups in the polymer. The product was isolated by evaporation of the solvent and extracting the tosylate deribvative with a mixture of water:alcohol. The tosylate derivative of up to about 20% of the hydroxyl groups were soluble is water while the 40% tosylation formed a water insoluble compound that was soluble in DMSO and DMF. The conjugation of an oligoamine such as spermine was by the reaction of the oligoamine and the tosylated polysacharide in the proper solvent at room temperature for 3 days.

This process was used for dextran and for oxidized dextran after reduction to the hydroxyls. This derivative is more susseptible to hydrolytic degradation as it has been partially oxidized. A similar procedure was applied for the derivatization of arabinogalactan, pullulan and chitosan.

The reaction is described below.

Modification of Polysaccharides with Tosyl or Mesyl Chlorides

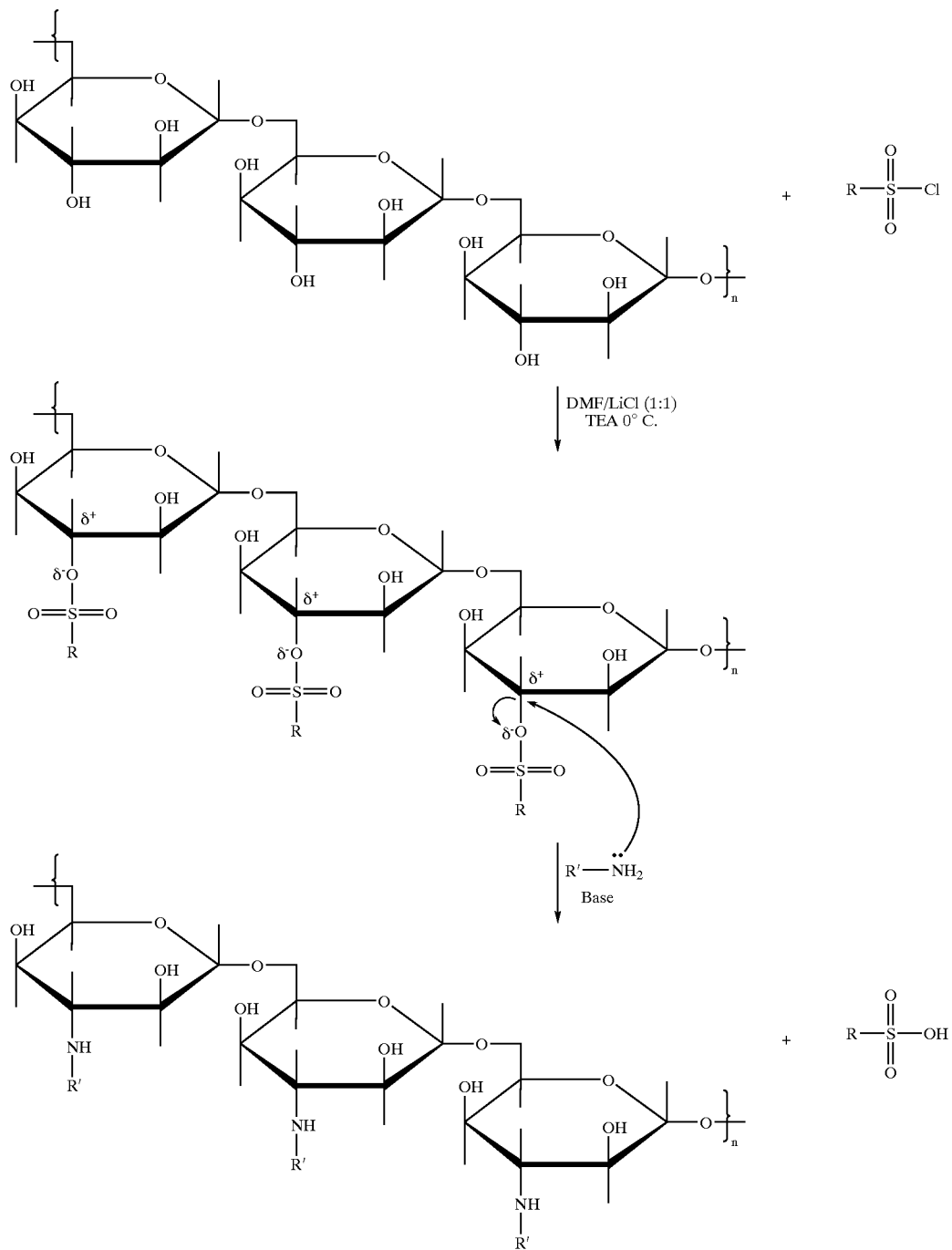

-continued
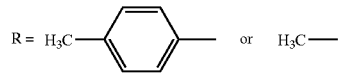
R' = —(CH$_2$)$_n$—NH$_2$ (n = 2, 3, 4, 5, 6 or 8).
—(CH$_2$)$_3$—NH—(CH$_2$)$_4$—NH—(CH$_2$)$_3$—NH$_2$ (Spermine).
—(CH$_2$)$_3$—NH—(CH$_2$)$_4$—NH$_2$ (Spermine).
—(CH$_2$)$_n$—N(CH$_3$)$_3$; [N-(trimethylammonium iodide)-α, ω-diamines (n = 2, 3, 4, 5, 6 or 8).
—(CH$_2$)$_3$—NH—(CH$_2$)$_4$—NH—(CH$_2$)$_3$—N(CH$_3$)$_3$; [N-(trimethylammonium iodide)-Spermine.
Oligoamine Derivatives of Dextran Via Tosylation
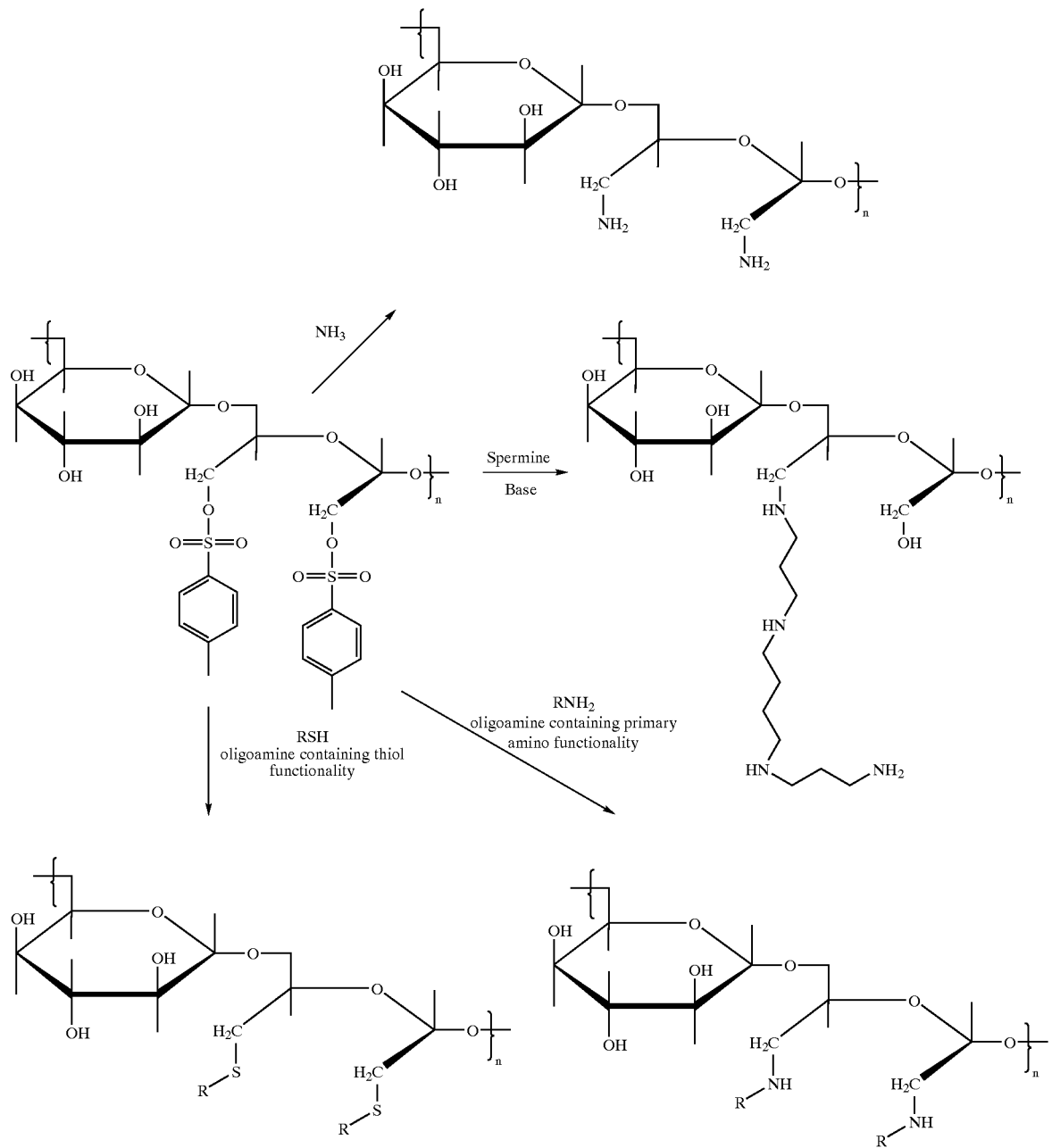

EXAMPLE 14

Conjugation of Monoquaternary Spermine to Oxidized Dextran

The monoquaternary amine was prepared by protection and de-protection method and reacting the primary amine with methyliodide. The primary amine was conjugated to the oxidized polysaccharide by reductive amination as shown below.

Conjugation of mono-quaternary-α,ω-alkane Diamines to di-aldehyde Polysaccharides

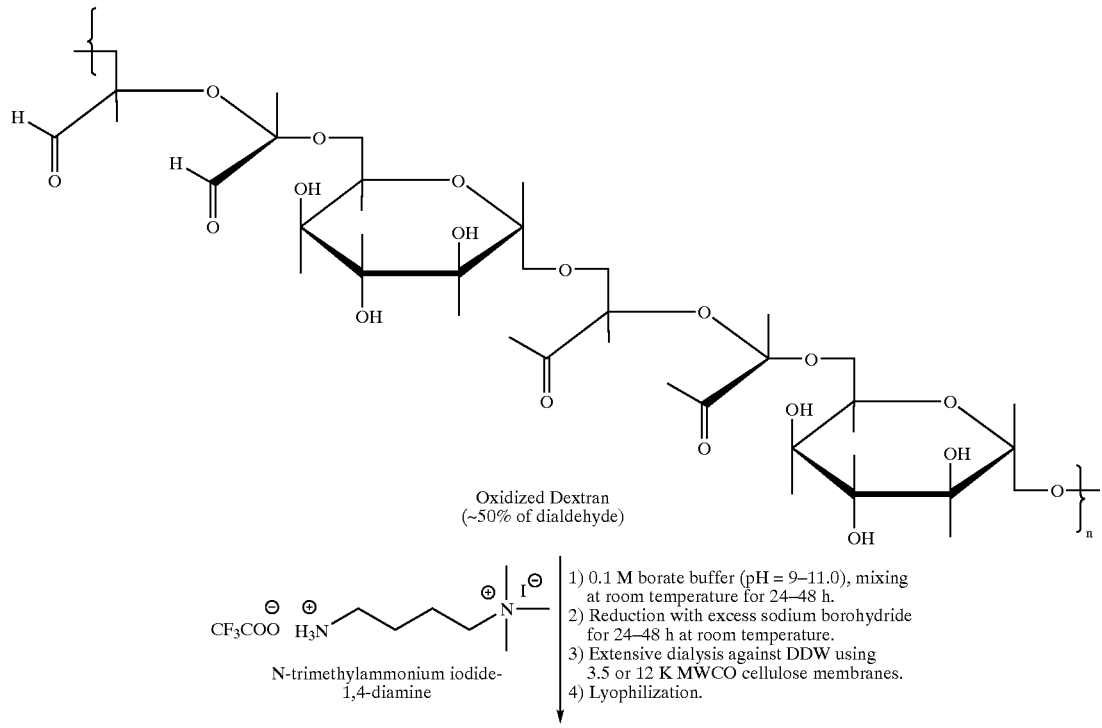

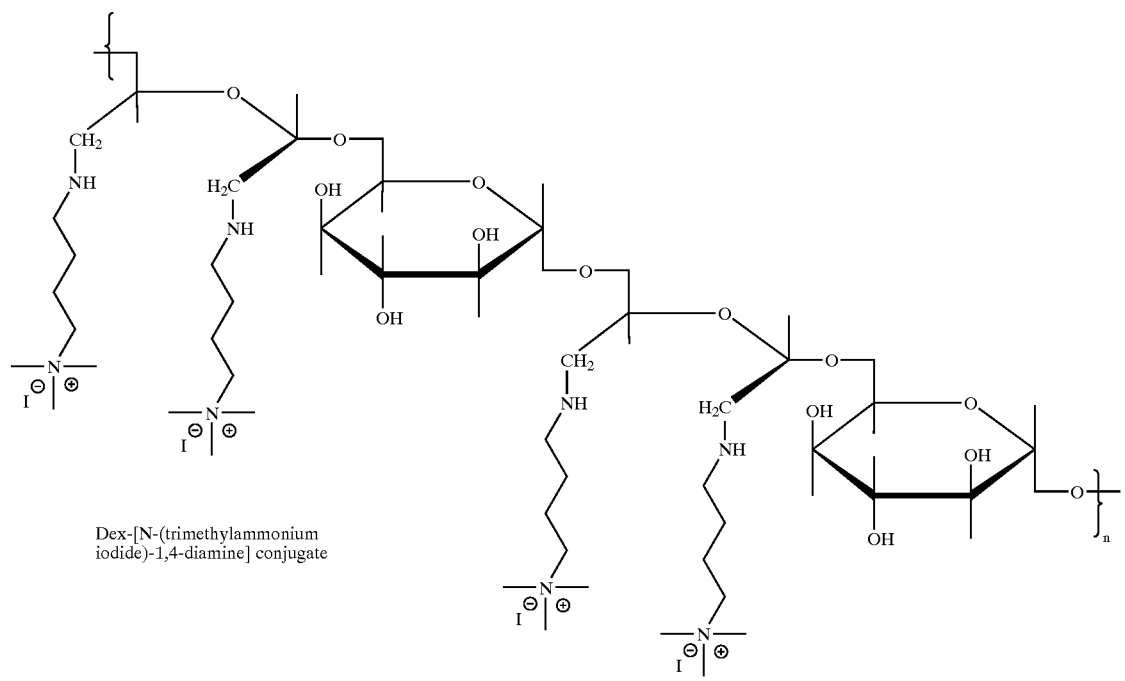

EXAMPLE 15

The transfection experiment described in Example 1 was used in this experiment to demonstrate the effectiveness of using amphiphilic lipids or polymers for enhanced transfection.

A typical experiment was run as follows: HEK cells and COS cells (25,000 per cm$^2$ or 5×10$^5$ cells per 60 mm culture dish) were plated a day before the experiment. The cells were gently washed with serum-free medium and 0.5 ml serum free medium per dish was added. Plasmid DNA (5 mg in 500 ml of serum-free sterile tube) was allowed to sit for one hour. Active polycation reagent from Table 2 was mixed with increasing amount of Transfast, a lipid polycation for complexation and added to the plasmid solution and mixed well and added to the cells (total 1.5 ml for a 60 mm plate) and allow to incubate for about 4 hours. At the end of the incubation period, the cells were gently overlaid with 4 ml of the complete medium with serum at 37° C. The cell mixture was allowed to incubate for about 48 to 72 hours (for luciferase and beta-galactosidase). The transfection efficiency was determined by counting the transfected cells having GFP (green fluorescence protein). A significant increase in transfection yield, from about 20% of the cell to about 40% was observed for the mixture of cations. In a similar experiment, increasing amount of polyethylene glycol, MW=400 was added to the plasmid complex prior to addition to the cells. An increase in the transfection yield was observed. It is expected that the increase in the effect will be more pronounced in the animal studies where amphiphilic additives may protect the complex from interference of body fluids.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A biodegradable polycation composition associated with an anionic macromolecule, the macromolecule being selected from the group consisting of a plasmid, an oligonucleotide, an antisense, a peptide, a protein, an anionic polysaccharide and combinations thereof, comprising:
   a) a natural or synthetic linear polysaccharide chain having an amount of saccharide units ranging from 2 to 2000; and
   b) at least one grafted oligoamine per 5 saccharide units, wherein the oligoamine is selected from the group consisting of a linear, branched and cyclic alkyl amine having at least two amino groups and the oligoamine has a molecular weight of up to 1000 Daltons.

2. A biodegradable polycation composition according to claim 1, wherein the natural linear polysaccharide chain is selected from the group consisting of dextrans, pullulan, cellulose, cellobios, inulin, chitosan, alginates and hyaluronic acid wherein the polysaccharide chain contains an amount of saccharide ranging from 2 to 2000 saccharide units.

3. A biodegradable polycation composition according to claim 1, wherein said saccharide units in a synthetic polysaccharide are connected by a bond selected from the group consisting of acetal, hemiacetal, ketal, orthoester, amide, ester, carbonate and carbamate.

4. A biodegradable polycation composition according to claim 1, wherein said polysaccharide is a synthetic polysaccharide formed from the condensation of an aldaric acid and a diaminoalkane.

5. A biodegradable polycation composition according to claim 1, wherein said grafted oligoamine is grafted to said polysaccharide chain by a bond selected from the group consisting of an amine bond, an amide bond and a carbamate bond.

6. A biodegradable polycation composition according to claim 1, wherein said oligoamine has the formula:

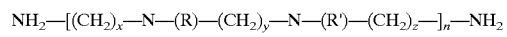

wherein x, y, z are integers between 0 and 4 and x+y+z is between 1 and 4 and n is at least 1 when x+y+z=2 or more, or at least 2 when x+y+z=1 and wherein R and R' groups are H or an aliphatic side group of 1 to 6 carbons.

7. A biodegradable polycation composition according to claim 1, wherein oligoamine is a peptide of up to 20 amino acids with at least 50% of the amino acids are cationic including lysine, ornithine, and diphthamic acid.

8. A biodegradable polycation composition according to claim 1, wherein the oligoamine is selected from the group consisting of spermine and alkyl-substituted spermine, wherein the alkyl substituent contains 1–6 carbons.

9. A biodegradable polycation composition according to claim 1, wherein the oligoamine is selected from the group consisting of a linear and branched ethyleneimine oligomer having up to 10 ethylene imine units.

10. A biodegradable polycation composition according to claim 1, having an amphiphilic residue wherein the amphiphilic residue is selected from the group consisting of fatty chains, phospholipids, cholesterols, ethylene glycol oligomers and propylene glycol oligomers.

11. A biodegradable polycation composition according to claim 10, wherein the ethylene and propylene glycol oligomers have a fatty chain block on one side.

12. A biodegradable polycation composition according to claim 10, wherein the amphiphilic residue is connected to the polysaccharide chain by a bond selected from the group consisting of an amine, amide, imine, ester, ether, urea, carbamate and carbonate.

13. A biodegradable polycation composition according to claim 10, wherein the amphiphilic residue facilitates the crossing of the polycation through biological membranes.

14. A biodegradable polycation composition according to claim 1, wherein the polycation composition is not toxic or immunogenic.

15. A biodegradable polycation composition according to claim 1, wherein the composition further comprises a ligand for facilitating the binding of said composition to a cell or tissue.

16. A biodegradable composition according to claim 1, in combination with cationic and nonionic lipids or polymers for cell transfection.

17. A biodegradable composition according to claim 1, wherein the linear polysaccharide is a dextran and said oligoamine is selected from the group consisting of spermine and alkyl-substituted spermine, wherein the alkyl substituent contains 1–6 carbons.

18. A pharmaceutical composition, comprising the composition of claim 1, in combination with a pharmaceutically acceptable carrier.

19. A pharmaceutical composition according to claim 17, wherein the pharmaceutically acceptable carrier is selected from a group consisting of amphiphilic cationic and non-ionic lipids in combination with cationic and non-ionic polymers useful for nucleotide delivery.

* * * * *

UNITED STATES PATENT AND TRADEMARK OFFICE
CERTIFICATE OF CORRECTION

PATENT NO. : 7,001,891 B1
APPLICATION NO. : 10/031728
DATED : February 21, 2006
INVENTOR(S) : Abraham J. Domb It is certified that error appears in the above-identified patent and that said Letters Patent is hereby corrected as shown below:

Claim 7, column 46, line 18, replace "wherein oligoamine" with --wherein the oligoamine--.

Signed and Sealed this

Twenty-eighth Day of August, 2007

JON W. DUDAS
*Director of the United States Patent and Trademark Office*